US009014404B2

(12) United States Patent
Aylward et al.

(10) Patent No.: US 9,014,404 B2
(45) Date of Patent: Apr. 21, 2015

(54) DIRECTIONAL ELECTROACOUSTICAL TRANSDUCING

(75) Inventors: J. Richard Aylward, Ashland, MA (US); Charles R. Barker, III, Framingham, MA (US); Klaus Hartung, Framingham, MA (US)

(73) Assignee: Bose Corporation, Framingham, MA (US)

( * ) Notice: Subject to any disclaimer, the term of this patent is extended or adjusted under 35 U.S.C. 154(b) by 621 days.

(21) Appl. No.: 13/414,093

(22) Filed: Mar. 7, 2012

(65) Prior Publication Data

US 2012/0224729 A1 Sep. 6, 2012

Related U.S. Application Data

(63) Continuation of application No. 10/643,140, filed on Aug. 18, 2003, now Pat. No. 8,139,797, which is a continuation-in-part of application No. 10/309,395, filed on Dec. 3, 2002, now abandoned.

(51) Int. Cl.

| | |
|---|---|
| ***H04R 5/02*** | (2006.01) |
| ***H04B 1/00*** | (2006.01) |
| ***H04S 3/00*** | (2006.01) |
| ***H04R 27/00*** | (2006.01) |
| *H04S 1/00* | (2006.01) |

(52) U.S. Cl.

CPC ................ *H04S 3/002* (2013.01); *H04R 27/00* (2013.01); *H04S 3/00* (2013.01); *H04R 2205/024* (2013.01); *H04R 2499/13* (2013.01); *H04S 1/002* (2013.01); *H04S 2420/01* (2013.01)

(58) Field of Classification Search

CPC ...... H04R 2499/13; H04R 5/02; H04R 5/023; H04R 1/26; H04S 3/00; H04S 2420/01; B60R 11/0217

USPC ........... 381/300, 302, 303, 306, 307, 310, 77, 381/79, 80, 86, 163, 387

See application file for complete search history.

(56) References Cited

U.S. PATENT DOCUMENTS

| | | | | |
|---|---|---|---|---|
| 4,199,658 | A * | 4/1980 | Iwahara | 381/304 |
| 5,883,961 | A * | 3/1999 | House et al. | 381/1 |
| 6,853,732 | B2 * | 2/2005 | Scofield | 381/27 |
| 7,424,127 | B1 * | 9/2008 | Holmi et al. | 381/386 |
| 7,440,578 | B2 * | 10/2008 | Arai et al. | 381/302 |

* cited by examiner

*Primary Examiner* — Vivian Chin
*Assistant Examiner* — Jason R Kurr
(74) *Attorney, Agent, or Firm* — Fish & Richardson P.C.

(57) ABSTRACT

A multichannel audio system for radiating sound to a listening area that includes a plurality of listening spaces. The audio system includes directional audio devices, positioned in a first of the listening spaces, close to a head of a listener, for radiating first sound waves corresponding to components of one of the channels and nondirectional audio devices, positioned inside the listening area and outside the listening space, distant from the listening space, for radiating sound waves corresponding to components of a second of the channels.

19 Claims, 31 Drawing Sheets

DIRECTIONAL ELECTROACOUSTICAL TRANSDUCING

CLAIM OF PRIORITY

This application is a continuation application and claims priority under 35 USC §120 to, U.S. patent application Ser. No. 10/643,140 filed on Aug. 18, 2003, (now, U.S. Pat. No. 8,139,797 issued on Mar. 20, 2012), which is a continuation-in-part application of, and claims priority to, U.S. patent application Ser. No. 10/309,395 filed on Dec. 3, 2002, now abandoned the entire contents of which are hereby incorporated by reference.

BACKGROUND OF THE INVENTION

The invention relates to an audio system for listening areas including a plurality of listening spaces and more particularly to and audio system that uses directional arrays to radiate some or all channels of a multichannel system to listeners.

It is an important object of the invention to provide an improved audio system that provides a realistic and consistent perception of an audio image to a plurality of listeners.

BRIEF SUMMARY OF THE INVENTION

According to the invention, an audio system having a plurality of channels includes a listening area, which includes a plurality of listening spaces. The system further includes a directional audio device, positioned in a first of the listening spaces, close to a head of a listener, for radiating first sound waves corresponding to components of one of the channels; and a nondirectional audio device, positioned inside the listening area and outside the listening space, distant from the listening space, for radiating sound waves corresponding to components of a second of the channels.

In another aspect of the invention, a method for operating an audio system for radiating sound into a first listening space and a second listening space, the first listening space adjacent the second listening space, includes receiving first audio signals; transmitting first audio signals to a first transducer; transducing, by the first transducer, the first audio signals into first sound waves corresponding to the first audio signals; radiating the first sound waves into a first listening space; processing the first audio signals to provide delayed first audio signals, wherein the processing comprises at least one of time delaying the audio signals and phase shifting the audio signals; transmitting the delayed first audio signals to a second transducer; transducing, by the second transducer, the delayed first audio signals into second sound waves corresponding to the delayed first audio signals; and radiating the second sound waves into the second listening space.

In another aspect of the invention, an adjacent pair of theater seats, includes a directional acoustic radiating device between the pair of theater seats.

In another aspect of the invention, an audio mixing system includes a playback system comprising directional acoustic radiating devices close to the head of an operator and acoustic radiating devices distant from the head of the operator.

In another aspect of the invention, a directional acoustic radiating device includes an enclosure; a first directional subarray comprising two elements, mounted in the enclosure, the first two elements coacting to directionally radiate first sound waves, each of the first two elements having an axis, the axes of the first two elements defining a first plane; a second directional subarray comprising two elements, mounted in the enclosure, the second two elements coacting to directionally radiate second sound waves, each of the second two elements having an axis, the axes of the second two elements defining a second plane; wherein the first plane and the second plane are nonparallel.

In another aspect of the invention, a method for radiating audio signals includes radiating sound waves corresponding to first audio signals directionally to a first listening space; radiating sound waves corresponding to second audio signals directionally to a second listening space; and radiating sound waves corresponding to third audio signals nondirectionally to the first listening space and the second listening space.

In another aspect of the invention, a directional acoustic array system, includes a plurality of directional arrays, each comprising a first acoustic driver and a second acoustic driver; wherein the first acoustic drivers of the plurality of directional arrays are arranged collinearly in a first line; and wherein the second of the acoustic drivers of the plurality of directional arrays are arranged collinearly in a second line; wherein the first line and the second line are parallel.

In still another aspect of the invention, a line array system includes an audio signal source for providing a first audio signal; a first line array comprising a first plurality of acoustic drivers mounted collinearly in a first straight line; a second line array comprising a second plurality of acoustic drivers mounted collinearly in a second straight line, parallel with the first straight line; signal processing circuitry coupling the audio signal source and the first line array for transmitting the first audio signal to the first plurality of acoustic drivers; the signal processing circuitry further coupling the audio signal source and the second plurality of acoustic drivers for transmitting the first audio signal to the second plurality of acoustic drivers; wherein the signal processing circuitry is constructed and arranged to reverse the polarity of the first audio signal transmitted to the second plurality of drivers.

In another aspect of the invention, an audio-visual system for creating audio-visual playback material includes a source of three dimensional video images; an audio mixing system for modifying audio signals constructed and arranged to provide modified audio signals that are transducible to acoustic energy having locational audio cues consistent with a sound source at a predetermined distance from a listener location; and a storage medium for storing the three dimensional video images and the modified audio signals for subsequent playback.

In another aspect of the invention, an audio-visual playback system for playing back audio-visual material that includes a sound track having audio signals includes a display device for displaying three dimensional video images; a seating device for a viewer of the audio-visual material; and an electroacoustical transducer, in a fixed local orientation relative to the seating device, for transducing the audio signals into acoustic energy corresponding to the audio signals so that the acoustic energy includes locational audio cues consistent with an audio source at a predetermined distance from the viewer.

In another aspect of the invention, an audio-visual playback system for playing back audio-visual material that includes a sound track having audio signals including locational cues consistent with an audio source at a predetermined distance from a viewer includes a display device for displaying three dimensional video images; a seating device for the viewer of the audio-visual material; and a directional electroacoustical transducer for transducing the audio signals into acoustic energy corresponding to the audio signals and for radiating directionally toward an ear of a viewer seated in the seating device, the acoustic energy.

In another aspect of the invention, in an audio system includes a directional acoustic device for transducing audio signals to acoustic energy having a directional radiation pattern and a nondirectional acoustic device for transducing audio signals to acoustic energy having a nondirectional radiation pattern. A method for processing, by the audio system, audio signals including spectral components having corresponding wavelengths in the range of the dimensions of the human head includes receiving first audio channel signals, the first audio channel signals including head related transfer function (HRTF) processed audio signals; receiving second audio channel signals, the second audio channel signals containing no HRTF processed audio signals; directing the first audio channel signals to the directional acoustic device; and directing the second audio channel signals to the nondirectional acoustic device.

In another aspect of the invention, an audio system includes a directional acoustic device for transducing audio signals to acoustic energy having a directional radiation pattern and a nondirectional acoustic device for transducing audio signals to acoustic energy having a nondirectional radiation pattern. A method for processing, by the audio system, audio signals including spectral components having corresponding wavelengths in the range of the dimensions of the human head includes receiving audio signals that are free of HRTF processed audio signals; processing the received audio signals into first audio signals including HRTF processed audio signals and audio signals not including HRTF processed audio signals; and directing the HRTF processed audio signals so that the directional acoustic device receives HRTF processed audio signals and so that the nondirectional acoustic device receives no HRTF processed audio signals.

In still another aspect of the invention, a method for mixing input audio signals to provide a multichannel audio signal output that includes a plurality of audio channels including spectral components having corresponding wavelengths in the range of the dimensions of the human head includes processing the input audio signals to provide a first of the output channels including head related transfer function (HRTF) processed audio signals; and processing the input audio signals to provide a second of the output channels free of head related transfer function (HRTF) processed audio signals.

Other features, objects, and advantages will become apparent from the following detailed description, when read in connection with the accompanying drawing in which:

DETAILED DESCRIPTION

It is appropriate to discuss some of the terminology and abbreviations used herein. For simplicity of wording "radiating sound waves corresponding to channel A (where A is a channel identifier of a multichannel system)" or "radiating sound waves corresponding to signals in channel A" will be expressed as "radiating channel A," and "radiating sound waves corresponding to signal B (where B is an identifier of an audio signal)" will be expressed as "radiating signal B", it being understood that acoustic radiating devices transduce audio signals, expressed in analog or digital form, into sound waves.

Figure 1:
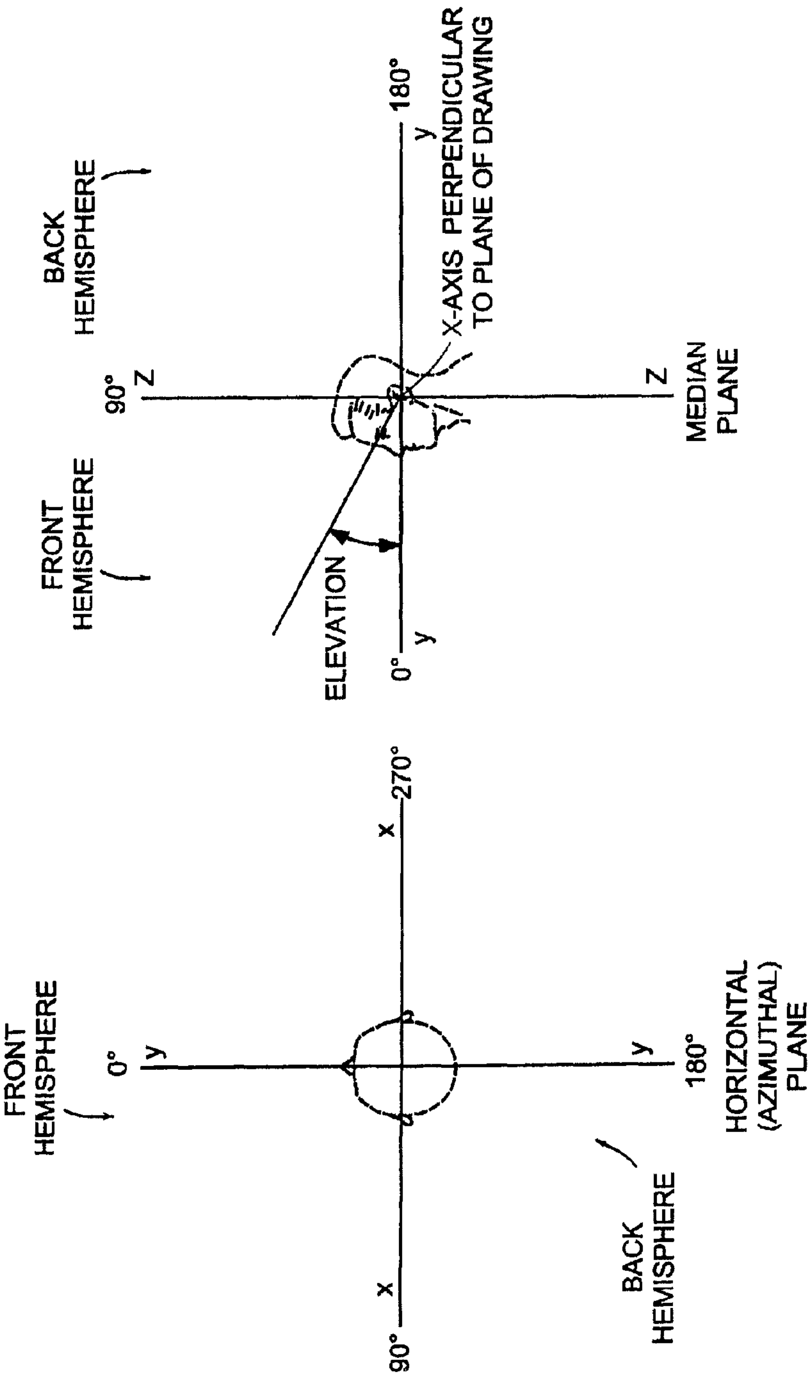
FIG. 1 is a diagram illustrating the coordinate system for expressing the directions and angles in the figures.

The coordinate system for the purpose of expressing directions and angles is shown in FIG. 1. The coordinate system has an origin the midpoint between a listener's two ears. The horizontal plane that includes a line between the listener's two ears will be referred to as the "azimuthal plane." For angles in the azimuthal plane, zero degrees is directly in front of the listener and angles are measured in degrees in a counter-clockwise direction. The line connecting the listener's ears is the 90-270 degree axis, and will hereinafter be referred to as the x-axis. The 0-180 degree axis, which is the perpendicular to the x-axis in the azimuthal plane, will hereinafter be referred to as the y-axis. In the disclosure and figures, unless otherwise noted, the directions and angles are in the azimuthal plane. The "median plane" is the vertical plane defined by the points that are equidistant from the listener's two ears. In the median plane, angles will be referred to as "elevation." Elevation angles are measured in an upward direction, with zero degrees in the azimuthal plane in front of the listener and 90 degrees directly upward from the listener. The 90-270 degree axis of the median plane will hereinafter be referred to as the z-axis. The x-axis and the z-axis define a front/back plane that divides space into a "front hemisphere" and a "back hemisphere."

"Listening space," as used herein means a portion of space typically occupied by a single listener. Examples of listening spaces include a seat in a movie theater, an easy chair, reclining chair, or sofa seating position in a domestic entertainment room, a seating position in a vehicle passenger compartment and other positions occupied by a listener. "Listening area," as used herein means a collection of listening spaces that are acoustically contiguous, that is, not separated by an acoustical barrier. Examples of listening areas are automobile passenger compartments, domestic rooms containing home entertainment systems, motion picture theaters, auditoria, and other volumes with contiguous listening spaces. A listening space may be coincident with a listening area.

"Local" as used herein refers to an acoustic device that is associated with a listening space and is configured to radiate sound so that it is significantly more audible in one listening space than in adjacent listening spaces. As will be described below in the discussion of FIG. 4A, a single acoustic device can be local to two adjacent listening spaces with respect to different audio signals. "Nonlocal" refers to an acoustic device that is not associated with a specific listening space and is configured to radiate sound with sufficient amplitude and dispersion so that the sound is audible in a plurality of listening spaces.

A "directional" acoustic device is a device that includes a component that changes the radiation pattern of an acoustic driver so that radiation from an acoustic driver is more audible at some locations in space than at other locations. Two types of directional devices are wave directing devices and interference devices. A wave directing device includes barriers that cause sound waves to radiate with more amplitude in some directions than others. Wave directing devices are typically effective for radiation having a wavelength comparable to the dimension of the wave directing device. Examples of wave directing devices are horns and acoustic lenses. Additionally, acoustic drivers become directional at wavelengths comparable to their diameters.

An interference device has at least two radiating elements, which can be two acoustic drivers, or two radiating surfaces of a single acoustic driver. The two radiating elements radiate sound waves that interfere in a frequency range in which the wavelength is larger than the diameter of the radiating element. The sound waves destructively interfere more in some directions than they destructively interfere in other directions. Stated differently, the amount of destructive interference is a function of the angle relative to the midpoint between the drivers.

One type of interference directional acoustic device is a directional array. A directional array has at least two acoustic drivers. The pattern of interference of sound waves radiated from the acoustic drivers may controlled by signal processing of the audio signals transmitted to the two drivers and by physical components of the array, such as the geometry and dimensions of the enclosure, by array element sizes, by individual element sizes, by orientation of the elements, and by acoustic elements such as acoustic resistances, compliances and masses.

Interaural time difference (ITD), that is, the difference in arrival time of a sound wave at the two ears, and interaural phase difference (IPD), that is, the phase difference at the two ears, aid in the determination of the direction of a sound source. ITD and IPD are mathematically related in a known way and can be transformed into each other, so that wherever the term "ITD" is used herein, the term "IPD" can also apply, through appropriate transformation. Interaural level difference (ILD), that is, the amplitude difference at the two ears also aids in the determination of the direction of a sound source. ILD is sometimes referred to as interaural intensity difference (BD). ITD, IPD, ILD, and BD are referred to as "directional cues." The ITD, IPD, ILD, and BD cues result from the interaction, with the head and ears, of sound waves that are radiated responsive to audio signals. For simplicity of wording, "ILD (or ITD or IPD, or IID) cues resulting from the interaction of sound waves with the head" will be referred to as "ILD (or ITD or IPD, or IID) cues" and "radiation of sound waves that interact with the head to result in the ILD (or ITD or IPD, or IID) cues" will be referred to as "radiating ILD (or ITD or IPD, or IID) cues."

An acoustic source in the median plane is equidistant from the two ears, so there are no ILD or ITD cues. For sound sources in the median plane monaural spectral (MS) cues assist in the determination of elevation. The external ear is asymmetric with respect to rotation about the x-axis, and affects different ranges of spectral components differently. The spectrum of sound at the ear changes with the angle of elevation, and the spectral content of the sound is therefore a cue to the elevation angle. An acoustic source in the median plane is equidistant from the two ears, so there are no ILD or ITD cues, only MS cues.

Figure 2A:
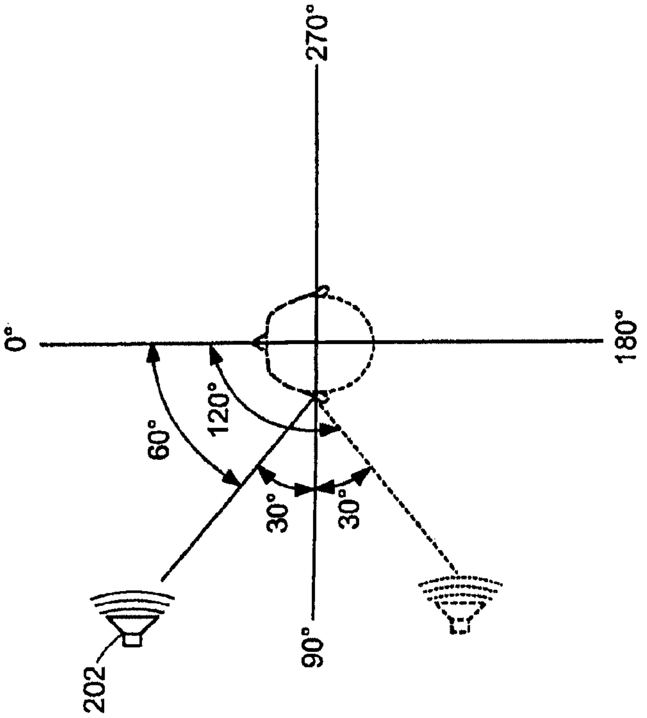
FIGS. 2A and 2B are diagrams explaining some of the concepts discussed in the disclosure.
Figure 2B:
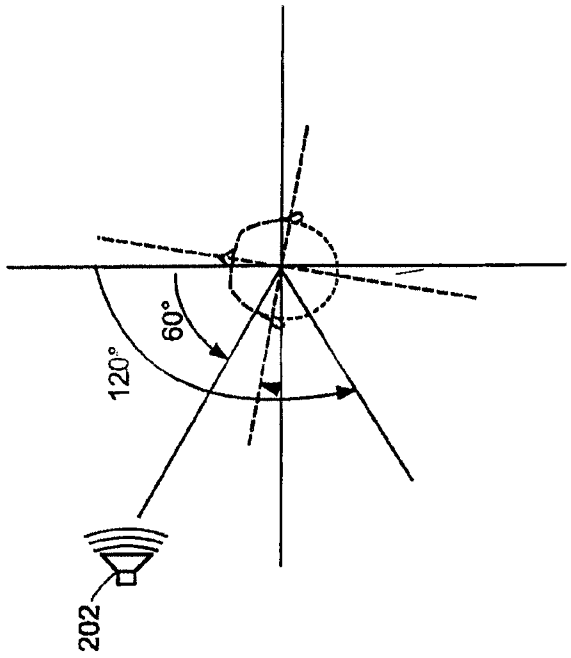

One phenomenon that humans frequently experience, especially when localizing simulated sound sources (that is, when directional cues are inserted into the radiated sound), is front/back confusion. Listeners typically can localize the angular displacement from the x-axis in the azimuthal plane, but have difficulty distinguishing the direction of displacement. For example, referring to FIG. 2A a listener may be able to determine that an audio source 202 is displaced 30 degrees from the x-axis, but may have difficulty distinguishing between sources at 60 degrees (shown in solid lines) and 120 degrees (shown in phantom). One method of resolving front/back confusion is to rotate the head. For example, as shown in FIG. 2B if the head is rotated clockwise as viewed from above, and the level in the left ear increases and the level in the right ear decreases, and the ITD cues change in a manner consistent with a sound sourced in the front, the front/back confusion is resolved and acoustic image will appear to be in the front hemisphere (at 60 degrees) rather than in back hemisphere (at 120 degrees).

Processing audio signals by a transfer function so that, when radiated, they have ITD or ILD or MS cues indicative of a predetermined orientation to the listener may include processing the audio signals by a function related to the geometry of the human head. The function is usually referred to as a "head related transfer function (HRTF)." Processing audio signals using an HRTF to so that, when radiated they have ITD or ILD or MS cues indicative of a predetermined orientation relative to the listener will be referred to as HRTF processing. Distance cues are indicators of the distance of a sound source from the listener. Some types of distance cues are the ratio of direct radiation amplitude to reverberant radiation amplitude; the time interval between direct radiation arrival and the onset of reverberant radiation; the frequency response of the direct radiation (high frequency radiation is attenuated more than low frequency radiation by distance); and ratio of signal radiation to ambient noise. For sources close to the head, ILD can also be a distance cue; for example, if sound radiation is audible in only one ear, the source will be perceived as very close to that ear.

For clarity, some elements, such as audio signal sources, amplifiers, and the like that are present in audio systems, but are not germane to this disclosure, are omitted from the views.

Unless noted otherwise, the number of channels of an audio source or playback system refers to the channels that are intended to be radiated by an audio device in a predetermined positional relationship to the listener. Many surround sound systems have channels, such as low frequency effects (LFE) and bass channels, which are not intended for reproduction by an audio device in a defined relationship to the listener. In an audio system having five or six channels, the channels are usually referred to as "left front (LF), center front (CF), right front (RF), left surround (LS), center surround (CS), right surround (RS), "surround" indicating that the channel is intended for radiation by an audio device behind the listener. Many of the configurations disclosed are stated in terms of an audio encoding system having five or six channels. It is to be understood that a person skilled in the art, with the teachings of this disclosure could apply the principles of the invention to an audio encoding system having more or fewer than five or six channels. If the audio signal source has more channels than the playback system, channels maybe downmixed in some manner so that the number of channels is equal to the number of channels in the playback system. If the audio signal source has fewer channels than the playback system, additional channels may be created from the existing channels, or one or more of the acoustic radiating devices may receive no signal.

Figure 3A:
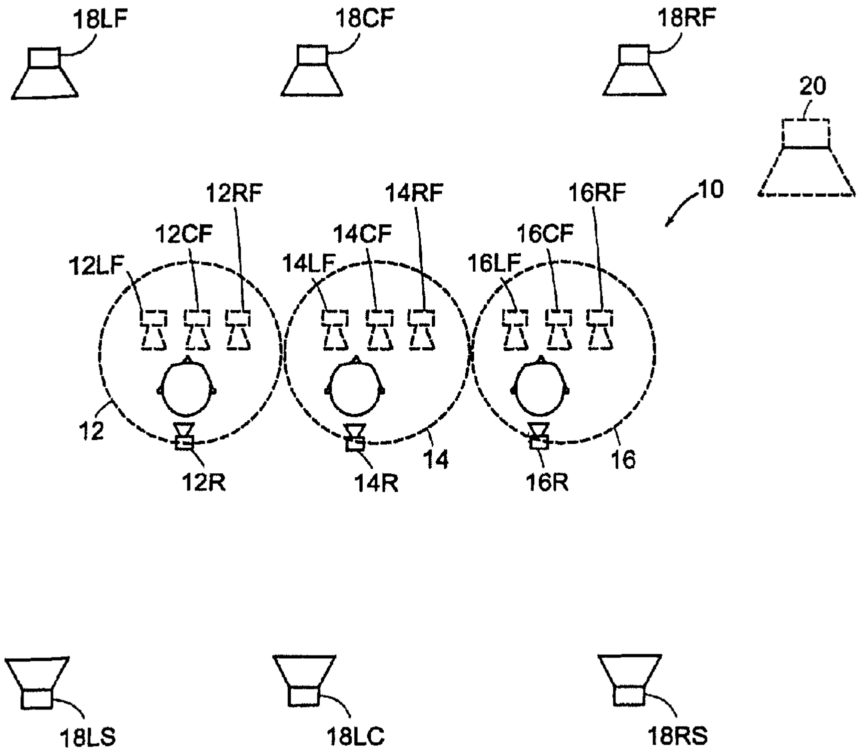
FIGS. 3A-3C are three embodiments of audio systems incorporating the invention.

With reference to FIG. 3A, there is shown a diagrammatic view of an embodiment of an audio system according to the invention. Listening area 10 includes a plurality 12, 14, and 16 of listening spaces. An audio system includes an audio signal source, not shown, and a plurality of nonlocal acoustic radiating devices identified as elements 18LF, 18CF, 18RF, 18LS, 18CS, and 18RS. Acoustic radiating devices 18LF, 18CF, 18RF, 18LS, 18CS, and 18RF receive audio signals representing the left front channel, the center front channel, the right front channel, the left surround channel, the center surround channel, and the right surround channels, respectively, and transduce the audio signals into sound waves with sufficient amplitude and dispersion so that listening spaces 12, 14, and 16 all receive sound waves radiated by acoustic radiating devices 18LF, 18CF, and 18RF. In addition, there may be local acoustic radiating devices 12R, 14R, and 16R, each associated with one of the listening spaces, and positioned and configured so that the radiated sound is audible in the associated listening space, and significantly less audible in adjacent listening spaces. The difference in audibility may be realized by a number of positioning methods, such as placing the acoustic radiating devices close to the ears (but not in a manner that significantly attenuates radiation from acoustic radiating devices 18LF, 18CF, and 18RF), by placing an acoustic radiating device significantly closer to one listener than other listeners, or both. The difference in audibility may also be realized by the use of barriers that are acoustically reflective or absorptive between an acoustic device and an adjacent listening space. The difference in audibility may also be realized by the use of directionality modifying devices such as horns, lenses, by the use of the natural directivity at wavelengths similar to the dimensions of the radiating device, or by the use directional devices such as directional arrays for local radiating devices 12R, 14R, and 16R, respectively. Directional arrays may include single acoustic driver arrays that use radiation from two surfaces of an acoustic driver and may also include an assortment of enclosures and acoustic filter elements. Directional arrays may also include multiple acoustic driver arrays. Implementations using directional arrays for local radiating devices 12R, 14R, and 16R are discussed in greater detail below, as are specific types of suitable directional arrays. Differences in audibility may also be realized by a combination of positioning methods, acoustic barriers, directional devices, and directional arrays.

An audio system using directional devices is advantageous over audio systems not using directional devices because greater isolation between spaces can be provided, so that listeners in adjacent listening spaces are less likely to be distracted by sound intended for a listener in the adjacent space.

One or more of the acoustic radiating devices may be supplemented by, or replaced by, one of more of local acoustic radiating devices 12LF, 12CF, 12RF, 14LF, 14CF, 14RF, 16LF, 16CF, or 16RF, each of which is associated with one of the listening spaces and which may be positioned and configured so that the radiated sound is audible in the associated listening space, and significantly less audible in adjacent listening spaces. The difference in audibility may be realized by one or more of the techniques discussed above. In one implementation, the acoustic radiating devices 12LF, 12CF, 12RF, 14LF, 14CF, 14RF, 16LF, to 16CF, and 16RF are limited range, high frequency acoustic drivers; typically having a range from 1.6 Khz or 2.0 kHz and up. If the acoustic radiating devices 12LF, 12CF, 12RF, 14LF, 14CF, 14RF, 16LF, 16CF, and 16RF are located close to the associated listening space, they require a very limited maximum sound pressure level (SPL). Because of the limited range requirement and limited maximum SPL requirement, small acoustic drivers, such as 20 mm diameter dome type acoustic drivers, may be adequate. In other implementations, acoustic radiating devices 12LF, 12CF, 12RF, 14LF, 14CF, 14RF, 16LF, 16CF, and 16RF may have wider frequency ranges or may be directional devices such as directional arrays. There may also be a low frequency acoustic radiating device 20, which radiates low frequency sound waves to the entire listening area 10. Low frequency radiating device 20 is not shown in subsequent figures.

The use of small acoustic drivers is advantageous because they can be easily located, and can be made unobtrusive. The small, limited range acoustic drivers can be placed, for example, in the back of a theatre or vehicle seat (radiating toward the seat behind); in an automobile dashboard, or in an armrest of a theatre seat or item of domestic furniture.

Nonlocal acoustic radiating devices 18LF, 18CF, 18RF, 18LS, 18CS, 18RS, and 20 may all be conventional acoustic radiating devices, such as cone type loudspeakers with maximum amplitude, frequency range, and other parameters appropriate for the acoustic environment. The acoustic radiating devices may have multiple radiating elements, and the multiple elements may have different frequency ranges. The acoustic radiating devices may include acoustic elements, such as ported enclosures, acoustic waveguides, transmission lines, passive radiators, and other radiators, and may also include directionality modifying devices such as horns, lenses, or directional arrays, which will be discussed in more detail below.

Figure 3B:
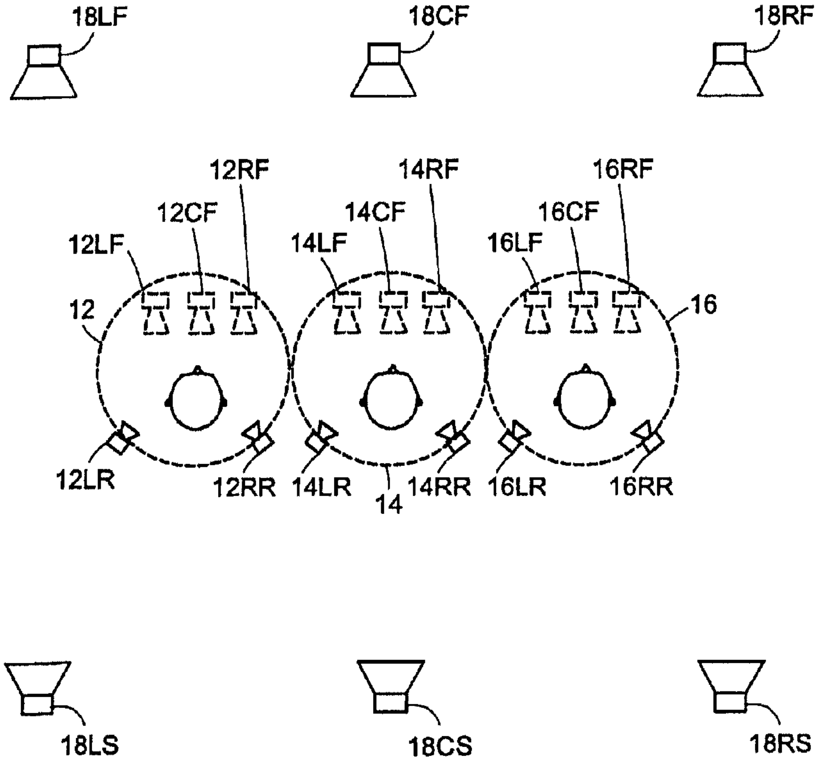

In the embodiment of FIG. 3B, the acoustic radiating devices 12R, 14R, and 16R of FIG. 3A are replaced by acoustic radiating devices 12LR and 12RR, 14LR and 14RR, and 16LR and 16RR, respectively. Each of the devices 12LR and 12RR, 14LR and 14RR, and 16LR and 16RR are associated with one ear of a listener in one of the listening spaces, each positioned and configured so that the radiated sound is audible by the associated ear and significantly less audible by the other ear and by listeners in adjacent listening spaces. The difference in audibility may be realized by one or more the methods described above.

Acoustic radiating devices 18LF, 18CF, and 18RF may be replaced by, or supplemented by, one or more of acoustic radiating devices 12LF, 12CF and 12RF, 14LF, 14CF and 14RF, and 16LF, 16CF and 16RF, respectively, each associated with one of the listening spaces, and each positioned and configured so that the radiated sound is audible in the associated listening space and significantly less audible in adjacent listening spaces. As discussed above, acoustic radiating devices 12LF, 12RF, 12CF, 14LF, 14RF, 14F, 16LF, 16RF and can be small, limited range acoustic drivers, or may be a directional device such as a directional array.

Figure 3C:
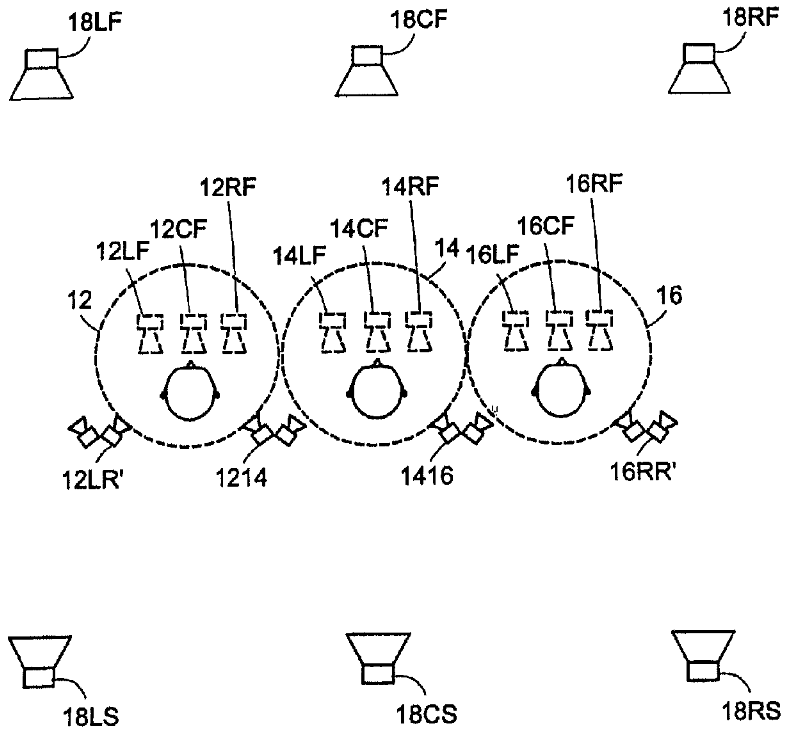

FIG. 3C shows another embodiment of the invention. In FIG. 3C, device 12LR of FIG. 3B is replaced by acoustic array 12LR'; devices 12RR and 14LR are replaced by acoustic array 1214; devices 14RR and 16LR are replaced by acoustic array 1416, and device 16RR of FIG. 3B is replaced by acoustic array 16RR'. The operation of the acoustic arrays will be discussed below in the discussion of FIGS. 4A-4C.

As with the configuration of FIGS. 3A and 3B, the acoustic radiating devices 18LF, 18CF, and 18RF may be replaced by, or supplemented by acoustic radiating devices 12LF, 12CF and 12RF, 14LF, 14CF, and 14RF, and 16LF, 16CF and 16RF, respectively. As described above, acoustic radiating devices suitable for devices 12LF, 12RF, 12CF, 14LF, 14RF, 14CF, 16LF, 16RF and 16CF may be small, limited range acoustic drivers or may be directional devices such as directional arrays.

In operation, some or all of the audio information is radiated by local acoustic devices. Some of the audio information may be radiated by nonlocal acoustic devices, in common to a plurality of listening spaces.

An audio system according to FIGS. 3A-3C is advantageous over sound radiating systems employing earphones and "head-mounted" devices. A system according to the invention avoids the "in the head" phenomenon typically associated with earphones. The sound source does not move with the head and the result of head motion can be made more realistic than with head-mounted devices without the need for signal processing or head motion tracking devices. For a commercial establishment, the sound radiating devices are far less susceptible to theft, damage, vandalism, or normal wear-and-tear. The hygiene concerns with headsets with multiple users is not a problem. An audio system according to FIGS. 3A-3C is advantageous over sound radiating systems using nondirectional acoustic devices because the acoustic device does not have to be positioned close to the head, and because a single device can radiate sound to two adjacent listening spaces.

Figure 4A:
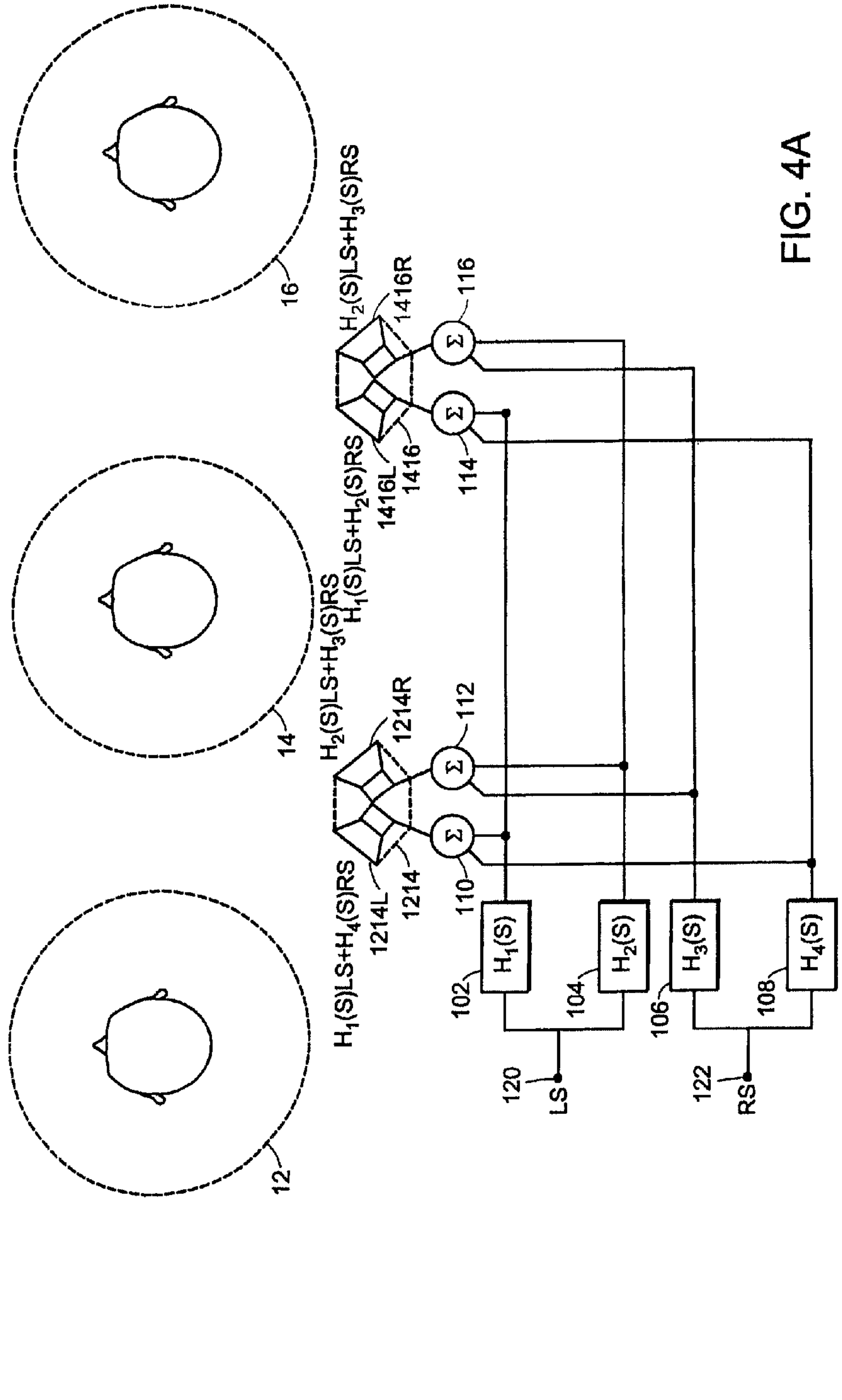
FIGS. 4A-4C are block diagrams of multielement arrays for use with some embodiments of the invention.

FIG. 4A shows circuitry for use with the multielement arrays suitable for elements 1214 and 1416; similar devices can be used for 12LR' and 16RR'. Devices 1214 and 1416 of FIG. 4A each have at least two acoustic drivers 1214L and 1214R, or 1416L and 1416R. LS signal input terminal 120 is coupled to acoustic drivers 1214L and 1416L by circuitry applying transfer function $H_1(s)$ (where s is the Laplace frequency variable $j\omega$ and $\omega=2\pi f$ so that $H_n(s)$ is a frequency domain representation of a transfer function), and by summers 110 and 114, respectively. LS signal input terminal 120 is coupled to acoustic drivers 1214R and 1416R by circuitry applying transfer function $H_2(s)$ and by summers 112 and 116, respectively. RS signal input terminal 122 is coupled to acoustic drivers 1214L and 1416L by circuitry applying transfer function $H_4(s)$ and by summers 110 and 114, respectively. RS signal input terminal 122 is coupled to acoustic drivers 1214R and 1416R by circuitry applying transfer function $H_4(s)$ and by summers 112 and 116, respectively. Transfer functions $H_1(s)$, $H_2(s)$, $H_3(s)$, and $H_4(s)$ can include combinations of polarity inversion, time delay, phase shift, minimum or nonminimum phase filter functions, signal amplification or attenuation, or a unity function (that is, a function that has no effect on the signal). The functions may be implemented by electronic circuitry, by physical elements, or by a microprocessor using digital signal processing (DSP) software.

In operation, devices 1214L and 1416L radiate the signal $H_1(s)LS+H_4(s)RS$, and devices 1214R and 1416R radiate the signal $H_2(s)LS+H_3(s)RS$. The circuitry can be configured so that transfer functions $H_1(s)$, $H_2(s)$, $H_3(s)$, and $H_4(s)$ cause the LS signal radiation from the drivers to destructively interfere in one direction generally directed toward the right ear of the listener in the listening space on the left and to interfere less destructively in the direction generally directed toward the left ear of the listener in the listening space on the right; and cause the RS signal radiation to destructively interfere in one direction generally directed toward the left ear of the listener in the listening space on the right and to interfere less destructively toward the right ear of the listener in the listening space on the left.

In one embodiment of FIG. 4A, $H_2(s)$ and $H_4(s)$ represent a unity function, and $H_1(s)$ and $H_3(s)$ represent a time delay, a phase shift, or both, and a polarity inversion so that driver 1214L and 1416L radiate $-G_1LS\Delta T+RS$, and drivers 1214R and 1416R radiate $LS-G_3RS\Delta T$, where $\Delta T$ represents a time shift and $G_n$ represents a gain associated with the transfer function having the same subscript, or so that drivers 1214L and 1416L radiate $-G_1LS\Delta\phi+RS$, and drivers 1214R and 1416R radiate $LS-G_3RS\Delta\phi$ where $\Delta\phi$ represents a phase, so that the LS radiation from directional arrays 1214 and 1416 destructively interferes at the listeners' right ears, and so that that the RS radiation from directional arrays 1214 and 1416 destructively interferes at the listeners' left ears. In another embodiment, $H_2(s)$ and $H_4(s)$ represent a unity function and $H_1(s)$ and $H_3(s)$ represent a signal phase shift, a gain, and a low pass filter. The phase shift can cause the LS radiation from drivers 1214 and 1416 to destructively interfere at the listeners' right ears, and can further cause the RS radiation from drivers 1214 and 1416 to destructively interfere at the listeners' left ears. The gain can facilitate the attaining of an appropriate amount of radiation attenuation. The low pass filter can adjust for the natural directivity of acoustic drivers at wavelengths comparable to and less than the diameter of the acoustic driver. The low pass filter may be implemented as a discrete device or may be incorporated into the circuitry implementing the transfer function.

The drivers are shown in FIG. 4A as positioned so that the axes of the radiation surfaces diverge. The diverging is not essential, but can take advantage of the aforementioned natural directivity of drivers at the wavelengths comparable to, or less than, the diameter of the acoustic driver. At frequencies at which the acoustic driver is naturally directional, directionality can be realized with less destructive interference.

The radiation patterns can be modified by additional drivers, circuitry, or both, representing additional transfer functions, which modify time, phase, and amplitude relationships.

An audio system according to FIG. 4A is advantageous over audio systems not employing directional arrays because it enables greater control of sound radiated to each ear of each listener. Additionally, the use of multi-element directional arrays permits a single array to radiate different audio information directionally to two adjacent listening spaces.

Examples of acoustic devices that can be used for devices 12LR', 1214, 1416, and 16RR' are described in U.S. Pat. No. 5,809,153 and U.S. Pat. No. 5,870,484.

Figure 4B:
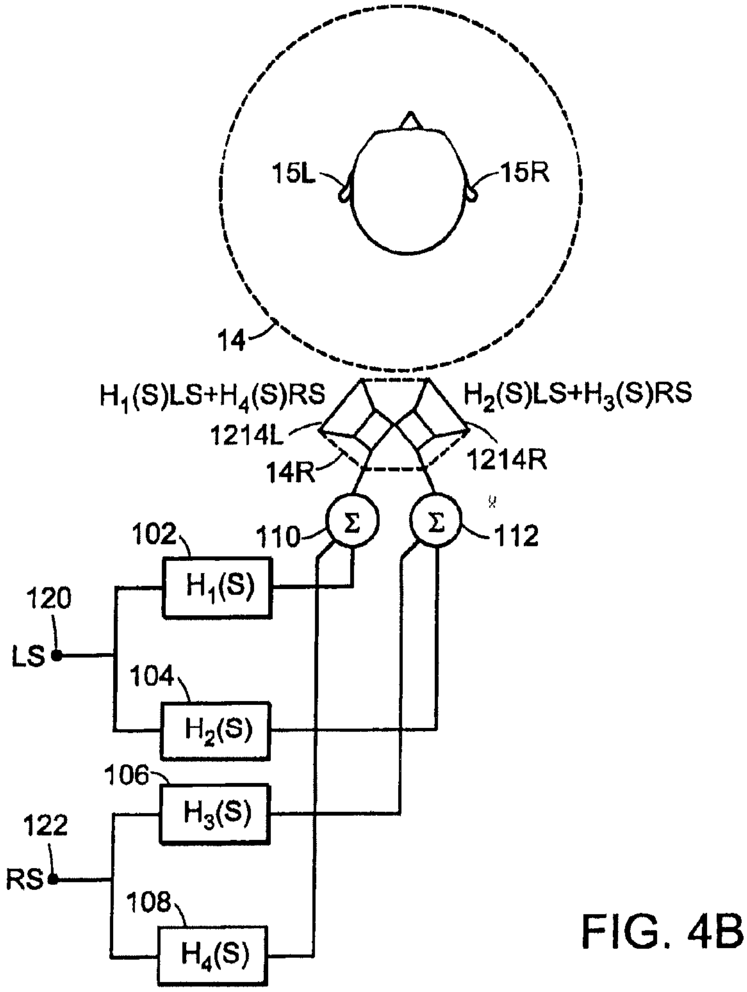

FIG. 4B shows an implementation of the embodiment of FIG. 3A, using a directional array for the local acoustic device 14R. Device 1214 has at least two acoustic drivers 1214L and 1214R. LS signal input terminal 120 is coupled to acoustic driver 1214L by circuitry applying transfer function $H_1(s)$ and by summer 110. LS signal input terminal 120 is coupled to acoustic driver 1214R by circuitry applying transfer function $H_2(s)$ and by summer 112. RS signal input terminal 122 is coupled to acoustic driver 1214L by circuitry applying transfer function $H_4(s)$ and by summer 110. RS signal input terminal 122 is coupled to acoustic driver 1214R by circuitry applying transfer function $H_3(s)$ and by summer 112.

In operation, driver 1214L radiates the signal $H_1(s)LS+H_4(s)RS$, and driver 1214R radiates the signal $H_2(s)LS+H_3(s)RS$. The circuitry can be configured so that transfer functions $H_1(s)$, $H_2(s)$, $H_3(s)$, and $H_4(s)$ cause the LS signal radiation to destructively interfere in the vicinity of a listener's right ear; the circuitry can further be configured so that transfer functions $H_1(s)$, $H_2(s)$, $H_3(s)$, and $H_4(s)$ cause the RS signal radiation to constructively interfere in the vicinity of a listener's right ear.

In one implementation of FIG. 4B, $H_1(s)$ and $H_3(s)$ represent a-unity function, and $H_2(s)$ and $H_4(s)$ represent a time delay, a phase shift, or both, and a polarity inversion, so that driver 1214R radiates $-G_2LS\Delta T+RS$, and driver 1214L radiates LS−$G_4$RSΔT, where ΔT represents a time shift and G represents a gain associated with the transfer function of the same subscript, or so that driver 1214R radiates −$G_2$LSΔϕ+RS, and driver 1214L radiates LS−$G_4$RSΔϕ where Δϕ represents a phase shift, so that the RS radiation from driver 1214L destructively interferes with the RS radiation from driver 1214R at the listener's left ear, and so that that the LS radiation from driver 1214R and destructively interferes with the LS radiation from driver 1214L, at the listeners' right ear. In other embodiments, $H_1(s)$, $H_2(s)$, $H_3(s)$, and $H_4(s)$ may include elements such as minimum or nonminimum phase filter functions, signal amplifiers or attenuators, and acoustic resistances, in addition to, or in place of phase shifters or time delays. The functions may be implemented by electronic circuitry, by physical elements, or by a microprocessor using DSP software.

Figure 4C:
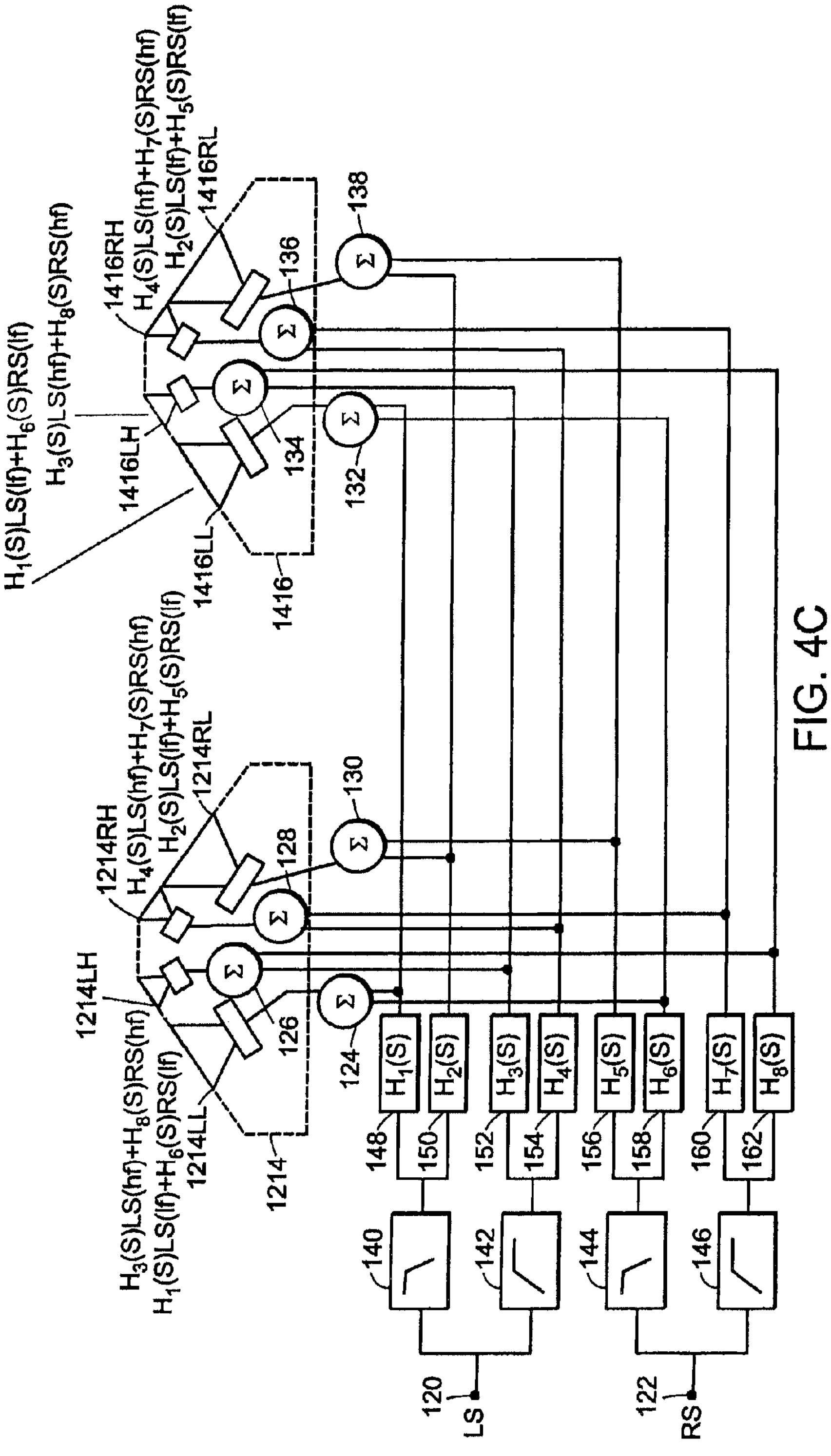

FIG. 4C shows an implementation of FIG. 4A, using a two-way (split frequency) directional array. Directional array 1214 has two low frequency acoustic drivers 1214LL and 1214RL and two high frequency acoustic drivers 1214LH and 1214RH. Directional array 1416 has two low frequency acoustic drivers 1416LL and 1416RL and two high frequency acoustic drivers 1416LH and 1416RH.

LS input terminal 120 is coupled to low pass filter 140 and high pass filter 142. Output of low pass filter 140 is coupled to low frequency acoustic drivers 1214LL and 1416LL by circuitry applying transfer function $H_1(s)$, and by summers 124 and 132, respectively. Output of low pass filter 140 is also coupled to low frequency acoustic drivers 1214RL and 1416RL by circuitry applying transfer function $H_2(s)$ and by summers 130 and 138, respectively. Output of high pass filter 142 is coupled to high frequency acoustic drivers 1214LH and 1416LH by circuitry applying transfer function $H_3(s)$ and by summers 126 and 134, respectively. Output of high pass filter 142 is also coupled to high frequency acoustic drivers 1214RH and 1416RH by circuitry applying transfer function $H_4(s)$ and by summers 128 and 136, respectively.

RS input terminal 122 is coupled to low pass filter 144 and high pass filter 146. Output of low pass filter 144 is coupled to low frequency acoustic drivers 1214LL and 1416LL by circuitry applying transfer function $H_6(s)$, and by summers 124 and 132, respectively. Output of low pass filter 144 is also coupled to low frequency acoustic drivers 1214RL and 1416RL by circuitry applying transfer function $H_5(s)$ and by summers 130 and 138, respectively. Output of high pass filter 146 is coupled to high frequency acoustic drivers 1214LH and 1416LH by circuitry applying transfer function $H_8(s)$ and by summers 126 and 134, respectively. Output of high pass filter 146 is also coupled to high frequency acoustic drivers 1214RH and 1416RH by circuitry applying transfer function $H_7(s)$ and by summers 128 and 136, respectively. In FIG. 4C, the low pass filters 140 and 144 and the high pass filters 142 and 146 are shown as discrete elements. In an actual implementation, the low pass and high pass filters can be incorporated in transfer functions $H_1$-$H_8$.

In operation, devices 1214LL and 1416LL radiate the signal $H_1(s)LS(lf)+H_6(s)RS(lf)$; devices 1214RL and 1416RL radiate the signal $H_2(s)LS(lf)+H_5(s)RS(lf)$; devices 1214LH and 1416LH radiate the signal $H_3(s)LS(hf)+H_8(s)RS(hf)$; devices 1214RL and 1416RL radiate the signal $H_4(s)LS(hf)+H_7(s)RS(hf)$, where lf denotes low frequency and hf denotes high frequency. The circuitry can be configured so that transfer functions $H_1(s)$-$H_8(s)$ cause the low frequency LS signal radiation to destructively interfere in the vicinity of listeners' right ears; to cause the low frequency RS signal radiation to destructively interfere in the vicinity of listeners' left ears; to cause the high frequency LS signal radiation to destructively interfere in the vicinity of listeners' right ears; and to cause the high frequency RS signal radiation to destructively interfere in the vicinity of listeners' left ears.

The split frequency directional arrays may be implemented with the high frequency acoustic drivers positioned inside the low frequency drivers as shown, or may be implemented with the two high frequency acoustic drivers positioned above or below the low frequency acoustic drivers. A typical operating range for low frequency acoustic drivers 1214LL, 1214RL, 1416LL, and 1416 RL is 150 Hz to 3 kHz; a typical operating range for high frequency acoustic drivers 1214LH, 1214RH, 1416LH, and 1416 RH is 3 kHz to 20 kHz.

Split frequency arrays are advantageous because useful destructive interference can be maintained over a wider range of frequencies.

The embodiments of FIGS. 3A-3C may implemented in a number of different ways, by configuring the audio system so that the local acoustic devices radiate signals typically radiated by one or more of devices 18LF, 18CF, 18RF, 18LS, 18CS and 18RS; by radiating, by directional devices, audio signals that have been processed by a head related transfer function (HRTF); by configuring the audio system to isolate, with respect to audio information radiated by one or more acoustic devices, a listening space from adjacent listening spaces; by configuring the audio system to isolate, with respect to audio content radiated by one or more audio devices, one ear of a listener from the other ear; by radiating distance cues from different combinations of acoustic devices; or by mixing audio content using a novel mixing system, and playing back the audio content by a novel playback system.

Figure 5A:
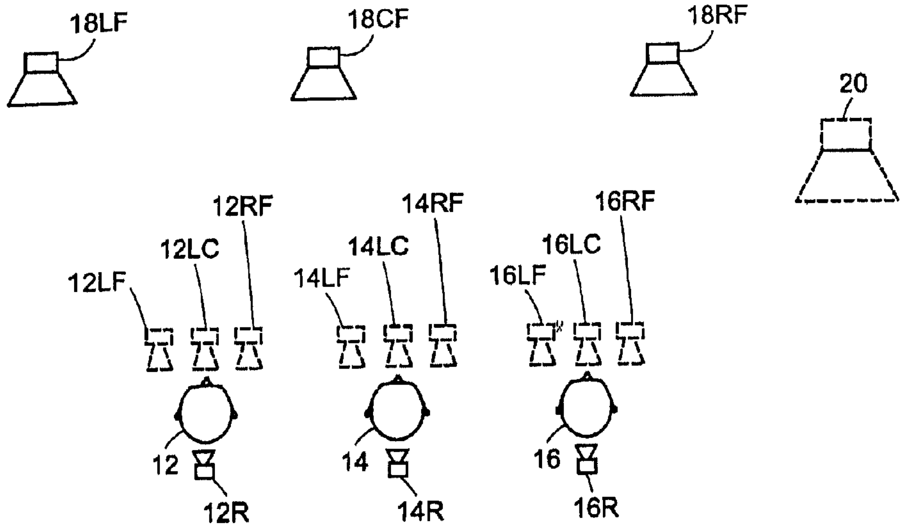
FIGS. 5A-5C are implementations of the embodiments of FIGS. 3A-3C.
Figure 5B:
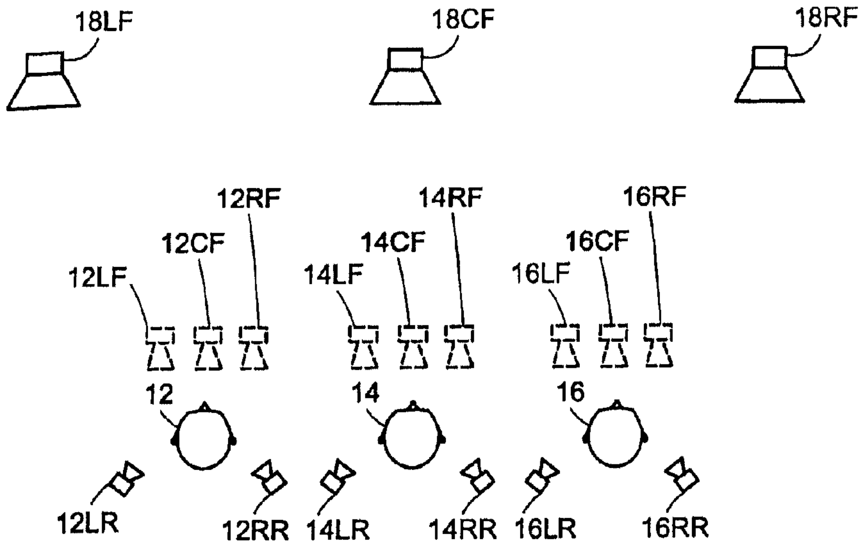
Figure 5C:
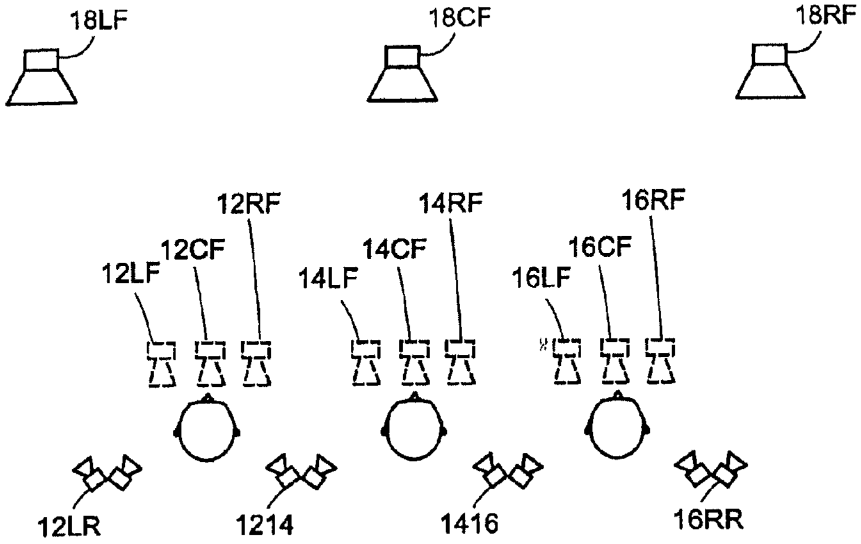

A first implementation of the embodiments of FIGS. 3A-3C is to reconfigure the elements of the audio system so that local acoustic devices (12R, 14R, and 16R of FIGS. 3A, 12LR, 12RR, 14LR, 14RR, 16LS, and 16RR, of FIG. 3B, and 12LR', 1214, 1416, and 16RR' of FIG. 3C) may radiate one or more of the left, center, and right front channels and the left, center, and right surround channels. FIGS. 5A-5C show such reconfigured audio systems. In FIG. 5A, the local acoustic devices 12R, 14R, and 16R radiate the surround channels in FIG. 3A, so devices 18LS, 18CS, and 18RS of FIG. 3A are not required. In FIG. 5B, the local acoustic devices 12LR, 12RR, 14LR, 14RR, 16LS, and 16RR radiate the surround channels in FIG. 3B, so devices 18LS, 18CS, and 18RS of FIG. 3B are not required. In FIG. 5C, the local acoustic devices 12LR, 1214, 1416, and 16RR radiate the surround channels in the manner described in FIG. 3C, so devices 18LS, 18CS, and 18RS of FIG. 3C are not required. Circuitry for implementing the configurations of FIGS. 5A-5C will be described below.

There are many environments in which an audio system according to FIGS. 5A-5C may be used. For example, the listening area may be a motion picture theater and the listening spaces may be individual seats; the listening area may be a vehicle interior and the listening spaces seat positions; the listening area may be a domestic entertainment room and the listening spaces seating positions or individual pieces of furniture.

An audio system according to FIGS. 5A-5C is advantageous because every listener receives the surround channel radiation from an acoustic radiating device or devices that have substantially the same orientation to each listener's head and that are substantially the same distance away from each listener's head. As a result, the spatial image is more uniform from listener to listener A second manner in which the embodiments of FIGS. 3B-3C may be implemented is to apply HRTF processing in an embodiment according to FIG. 3A with directional arrays radiating two channels as in FIG. 4B. HRTF processed audio signals can be radiated by acoustic devices in either hemisphere, so long as the sound at the ear contains the appropriate ITD and ILD cues.

ITD cues and ILD cues may be generated in at least two different ways. A first way is known as "summing localization" or "amplitude panning" in which the amplitude of an audio signal sent to various acoustic devices is modified so that when transduced, the resultant sound wave pattern that arrives at a listener's ears has the appropriate ITD and ILD cues. For example, if an audio signal is sent only to acoustic device 18LF so that only device 18LF radiates the signal, the sound source will appear to be in the direction of device 18LF. If an audio signal is sent to devices 18RF and 18CF, with the amplitude of the signal to 18CF larger than the amplitude of the signal sent to 18RF, the sound source will appear to be between devices 18CF and 18RF, somewhat closer to device 18CF. Generally, amplitude panning is most effective for audio sources near the y-axis, for example, in the previous figures, sources located in the angle defined by lines connecting acoustic devices 18LF and 18RF and the origin. Using amplitude panning, radiated by acoustic drivers in the same hemisphere as the sound source provides a realistic effect if the head is rotated to resolve front/back confusion.

For sound sources near the x-axis, amplitude panning is less effective, and HRTF processing of the audio signals may provide a more precise perception of an acoustic image. The HRTF processing of the audio signals includes modifying the signals so that, when transduced to sound waves, the sound waves that arrive at the ears have the ITD and ILD cues that correspond to the ITD and ILD cues of an audio source at the desired location. In HRTF processing, the ITD and ILD cues at the ear is of greater importance than the specific location of the transducer that radiates the HRTF processed audio signals.

A signal processing method for applying HRTF processing to the signals that are transduced by the directional acoustic devices is described below. Applying HRTF processing to signals that are transduced by the directional acoustic devices is advantageous because the directional acoustic devices permit greater control over the audio information at the listener's ears and provide greater uniformity of audio information at the ears of multiple listeners. As seen in the previous figures, the directional acoustic devices are in the same orientation relative to each listener's two ears. Additionally, since the audio information radiated by the directional devices is significantly less audible in adjacent listening spaces, less audio information intended, for example, for the listener in listening space 14 is audible to the listener in listening space 12. Additionally, the audio information intended for one ear of a listener may be less audible to the other ear of the listener.

The use of both amplitude panning and HRTF processing is advantageous because amplitude panning and HRTF processing each have advantages for locating a sound source at orientations relative to the listener. HRTF processing results in a more realistic perception of an acoustic image for sound sources near the x-axis. Amplitude panning results in a more realistic image for sound sources near the y-axis and ITD and ILD cues that are consistent with real source when head rotation is used to determine the direction of an acoustic image.

A third manner in which the embodiments of FIGS. 3A-3C may be applied is to isolate, using directional acoustic devices, a listening space from adjacent listening spaces. For example, in the systems of the previous figures, by using directional devices for devices 12LF, 14LF, or 16LF, 12CF, 14CF, or 16CF, and 12RF, 14RF, or 16RF (in addition to the audio information radiated by the directional devices 12R, 14R, 16R, 12LR, 12RR, 14LR, 14RR, 16LR, and 16RR) each listening space can be isolated from adjacent listening spaces. In the system of FIGS. 5A-5C, the adjacent listening spaces can be isolated from each other with respect to the audio information radiated by the directional devices.

The isolation methods that can be used are similar to methods for realizing differences in audibility mentioned above: by proximity; by placing a reflective or absorptive acoustic barrier in the path between an acoustic device and a listener's ear or between and acoustic device and an adjacent listening space; and by using directional devices, including directional arrays.

Depending on the degree of isolation attained, some advantageous features can be provided. For example, some information can be radiated in common to several listening spaces and some audio information can be radiated individually to the several listening spaces. So, for example, a sound track of a motion picture could be radiated from devices 18LF, 18CF, and 18RF, and the dialogue could be radiated in different languages to adjacent listening spaces. In such an application, local devices 12LR, 12RR, 14LR, 14RR, 16LR, 16RR, 12R, 14R, or 16R can radiate the surround channels as well as the dialogue. Another feature that can be provided is to radiate completely different program material to adjacent listening spaces; for example at a diplomatic or business meeting, different translations of speech could be radiated to participants without the use of headphones or head mounted speakers.

A fourth manner in which the embodiments of FIGS. 3A-3C may be applied is to isolate, with respect to the channels radiated by the local acoustic devices, one ear of a listener from the other ear. Such a configuration provides a more precise and uniform spatial image and lessens the need to process audio signals for "cross-talk" cancellation.

A fifth implementation is to radiate distance cues from different combinations of acoustic devices. Radiation from non-local acoustic devices 18LF, 18CF; and 18RF interacts with the room, producing distance cues that cause the sound to appear to originate at an audio source at a location relative to the room. Radiation from local devices 12R, 14R, and 16R of FIG. 3A or from 12LR, 12RR, 14LR, 14RR, 16LR and 16RR of FIG. 3B, or from devices 12LR', 1214, 1416, and 16RR' of FIG. 3C interact with the room very little. If the audio signals radiated by the local devices are modified so that they produce distance cues at the ears of the listeners, and the same signals are radiated by the local audio devices associated different listening spaces, the sound appears to each listener to originate at the distance relative to the user. This approach allows great flexibility in selecting the perceived distance and of a sound source and great control over, and uniformity in, the distance cues perceived by each listener. For example, sound sources may appear to be very close to each listener. Additionally, the perceived distance can be made uniform irrespective of the acoustic characteristics of the room or the listener's position in the room.

Any of the configurations of FIGS. 3A-3C and 5A-5C can be implemented with the listener faced oppositely from the direction of FIGS. 3A-3C and 5A-5C. For example, the configuration of FIG. 3A can be implemented with acoustic radiating devices 18LF, 18CF and 18RF behind the listeners, and acoustic radiating devices 12R, 14R, and 16R in front of the listeners.

Figure 6:
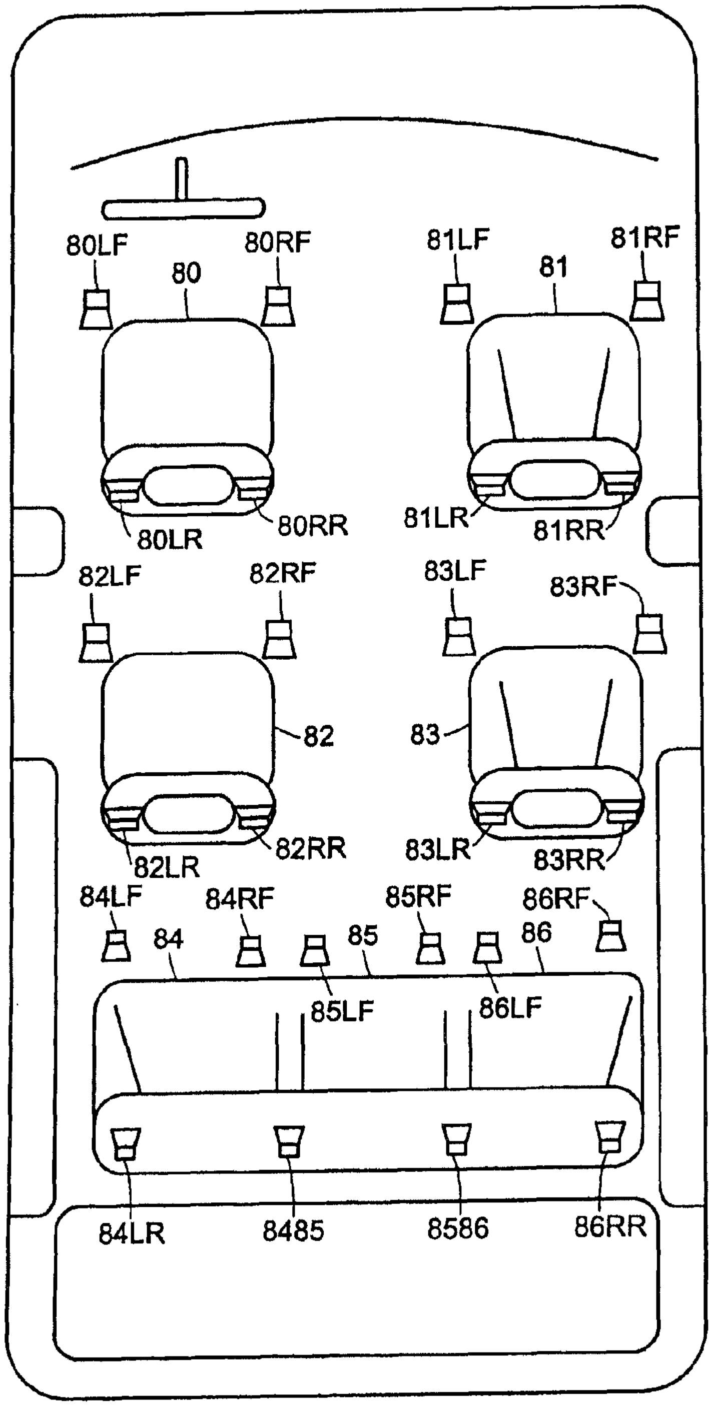
FIG. 6 is a block diagram of an implementation of the invention in a vehicle passenger compartment.

FIG. 6 shows another embodiment of the invention. In the embodiment of FIG. 6, vehicle 90 includes seven seating positions 80-86. Each of seating positions 80-83 has associated with it a pair of directional acoustic radiating devices positioned behind and to the left (designated "LR") and behind and to the right (designated "RR"). Devices 80LR, 80RR, 81LR, 81RR, 82LR, 82RR, 83LR, and 83RR may be mounted in the headrest or seat back. Seating position 84 has associated with it directional acoustic radiating device 84LR, positioned behind and to the left. Seating position 86 has associated with it directional acoustic radiating device 86RR, positioned behind and to the right. Acoustic radiating device 8485 is positioned behind and between seating positions 84 and 85, and acoustic radiating device 8586 is positioned behind and between seating positions 85 and 86. Each of seating positions 80-86 may have associated with it one of front acoustic devices 80LF, 81LF, 82LF, 83LF, 84LF, 85LF, 86LF, 80RF, 81RF, 82RF, 83RF, 84RF, 85RF, and 86RF, located in front of the seating position in, for example the ceiling, in a console, in the seatback of the seat in front, in the dashboard, or in an armrest. Each seating position also may have associated with it a bass acoustic radiating device, not shown in this view, or alternatively, there may be one or more bass acoustic radiating devices radiating bass frequencies to the entire passenger compartment. In other implementations, devices 80LF, 81LF, 82LF, 83LF, 84LF, 85LF, 86LF, 80RF, 81RF, 82RF, 83RF, 84RF, 85RF, and 86RF, may be supplemented by, or replaced by, acoustic devices that radiate sound waves with sufficient dispersion and amplitude to be audible in more than one listening space, or may be supplemented by, or replaced by, single devices such as the devices 12CF, 14CF, and 16CF of FIG. 1A.

Acoustic radiating devices 80LF, 81LF, 82LF, 83LF, 84LF, 85LF, 86LF, 80RF, 81RF, 82RF, 83RF, 84RF, 85RF, and 86RF may be devices as described above in the discussion of FIGS. 3A-3C and 5A-5C; any of the devices 80LF, 81LF, 82LF, 83LF, 84LF, 85LF, 86LF, 80RF, 81RF, 82RF, 83RF, 84RF, 85RF, 86RF, 80LR, 80RR, 81LR, 81RR, 82LR, 82RR, 83LR, 83RR, 84LR, 8485, 8586, and 84RR may be directional arrays as described above. There may be additional bass loudspeakers (not shown) or wide or full range loudspeakers (not shown) in location such as in the vehicle door or parcel shelf not shown.

In operation, the audio system functions in manner similar to the audio systems described above.

FIGS. 7A-7E show, respectively, an isometric view, a front plan view, a top plan view, and a side plan view of a directional acoustic array device 50 that can be used as devices 1214 and 1416 of FIGS. 3C and 5C, especially in a theatre or home theater environment. The directional acoustic array device 50 includes a first subarray including acoustic radiating devices 52 and 54 and a second subarray including acoustic radiating devices 56, and 57 positioned below the first pair. Each acoustic radiating device of each pair is angled to the other of the pair (that is, in the x-y plane), as shown most clearly in FIG. 7C. A typical such angle $\phi$ is 145 degrees. Additionally, each pair of acoustic radiating devices is angled relative to the other pair (that is, in the y-z plane) as shown most clearly in FIG. 7D. A typical such angle $\theta$ is 135 degrees.

Figure 7A:
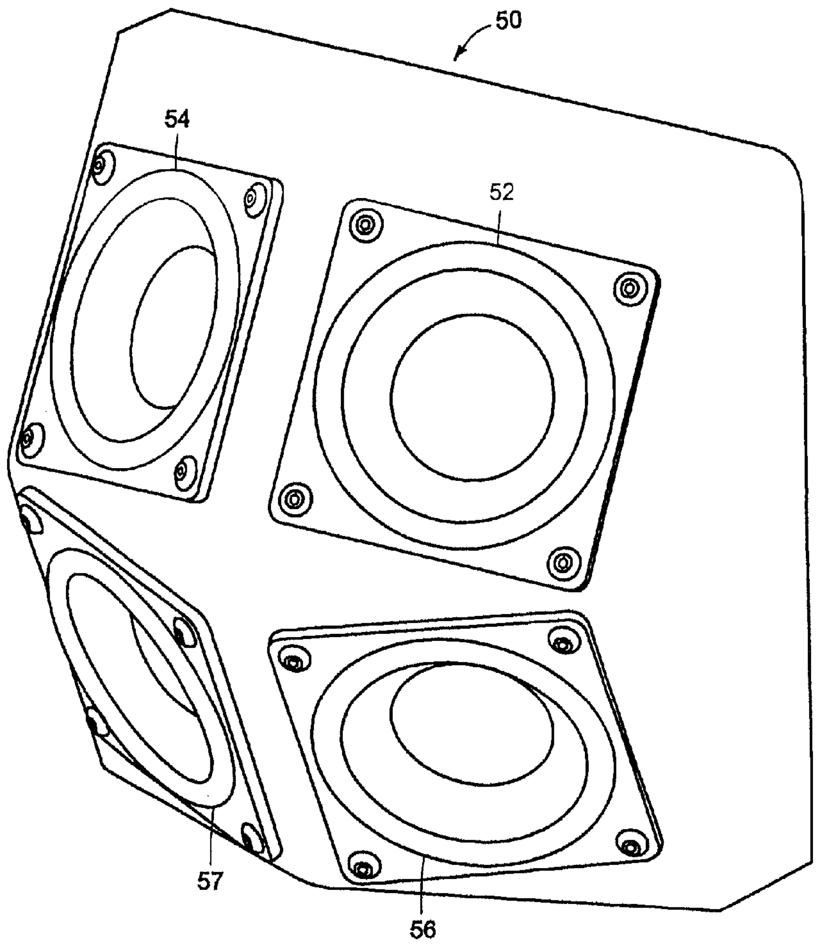
FIGS. 7A-7G are views of a multielement array suitable for use with the invention, mounted in a theatre seat.
Figure 7B:
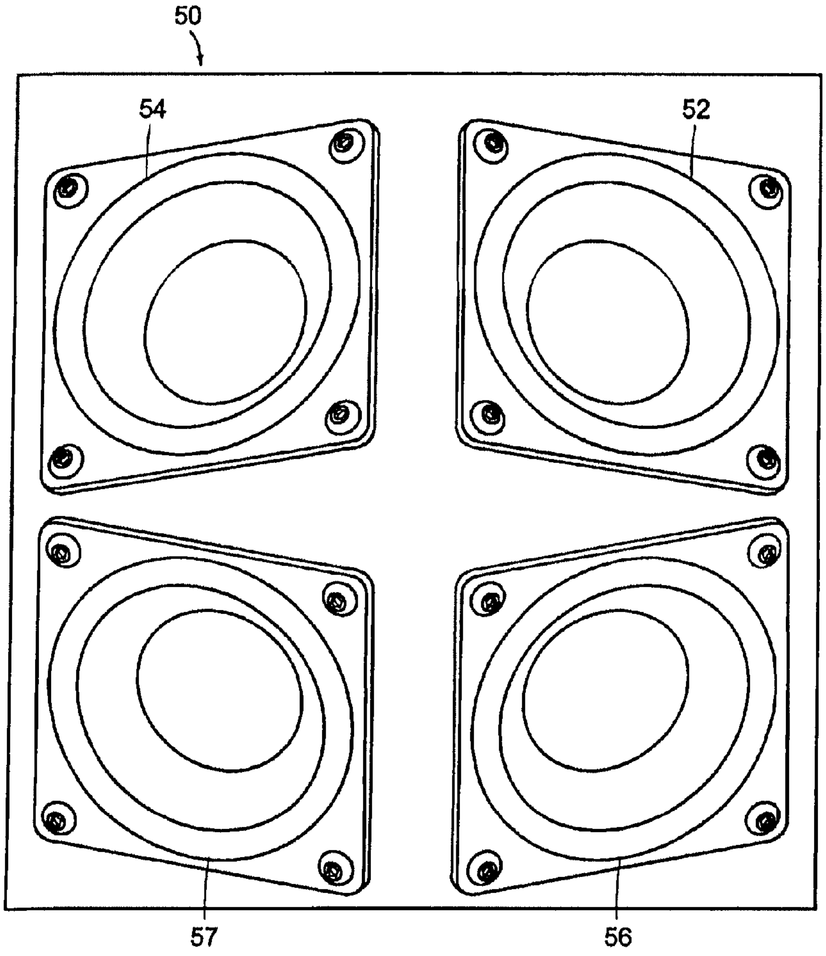
Figure 7C:
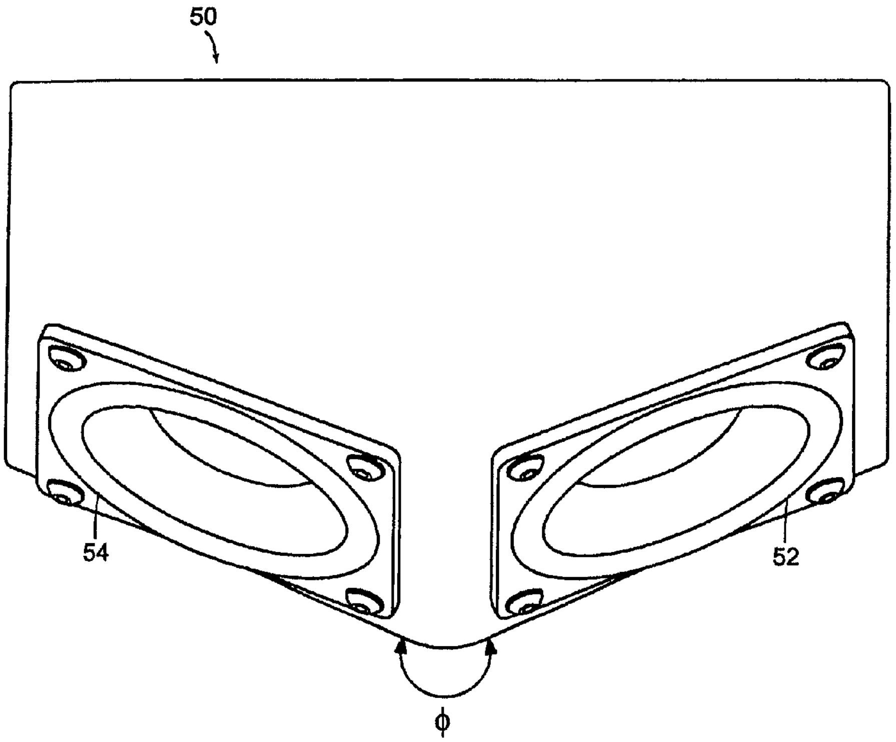
Figure 7D:
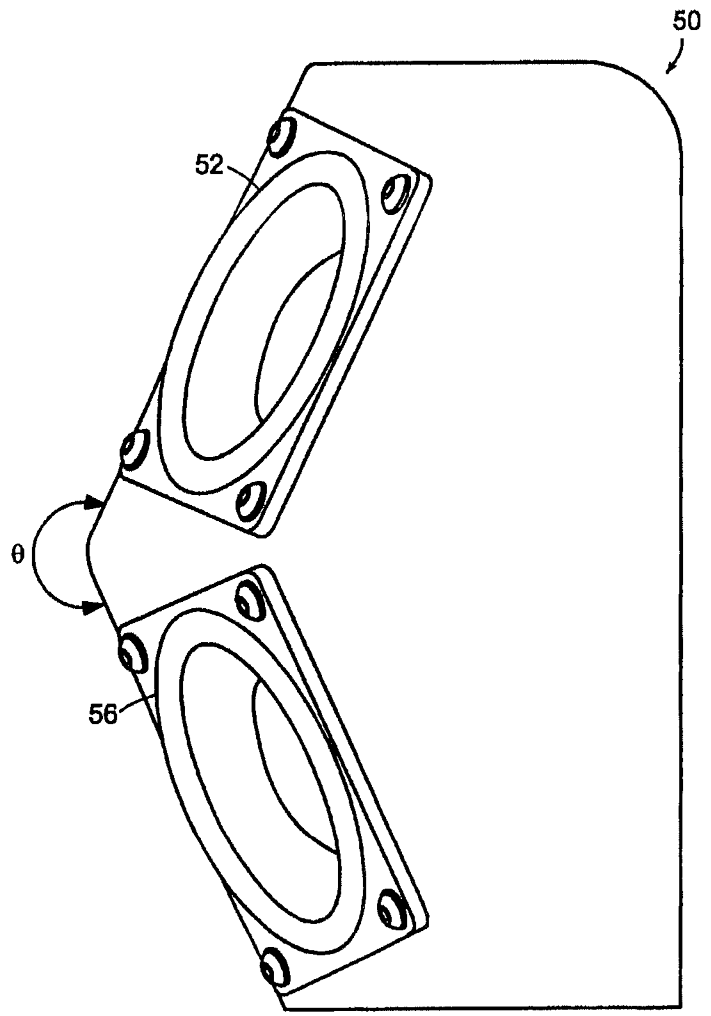
Figure 7E:
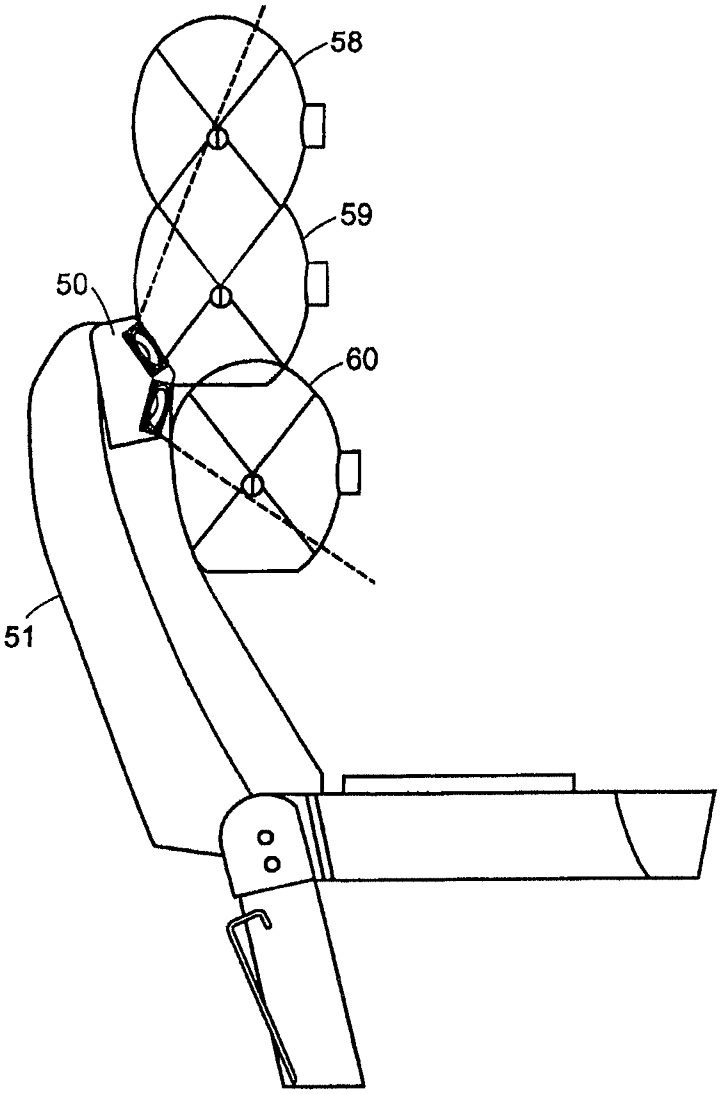

The angling of each of the pairs of acoustic radiating devices relative to the other pair, most clearly seen in FIG. 7D enables the directional characteristics of the array 50 to be effective over a range of listening heights, for example a range of heights including the typical head positions of a tall person 58 (a typical head height of a 6'7" person sitting upright), medium height person 59 (a typical head height of a 5'10" person sitting upright), or short person 60 (a typical head height of a twelve year old human sitting upright) of FIG. 7E In other embodiments, angles $\phi$ or $\theta$ or both may be 180 degrees.

Figure 7F:
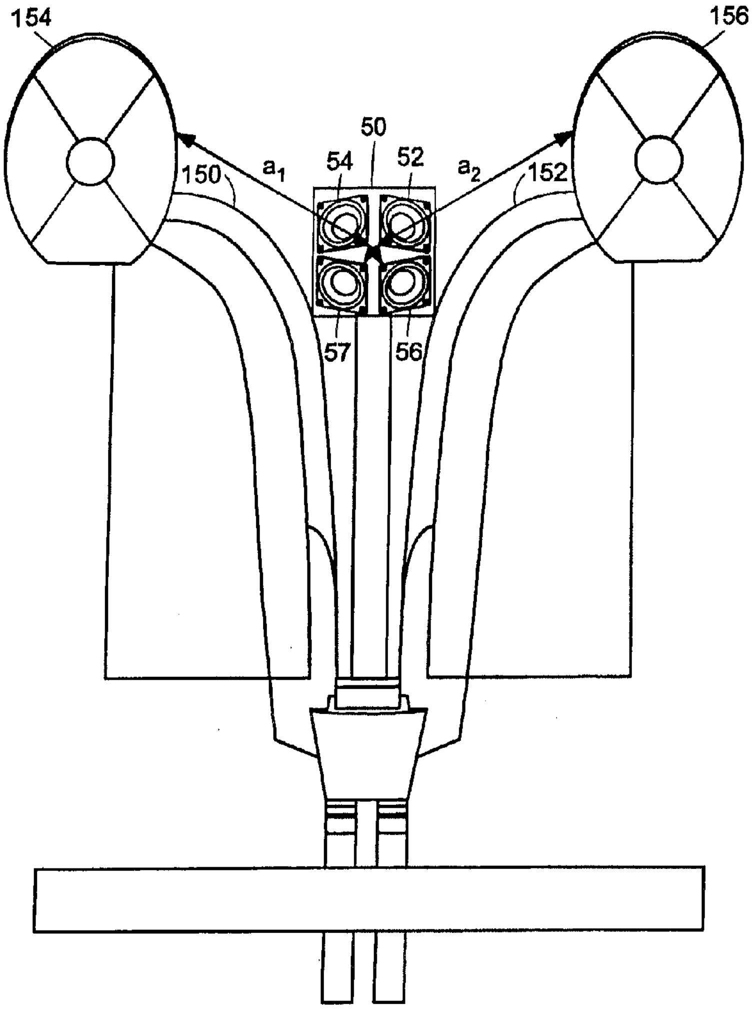
Figure 7G:
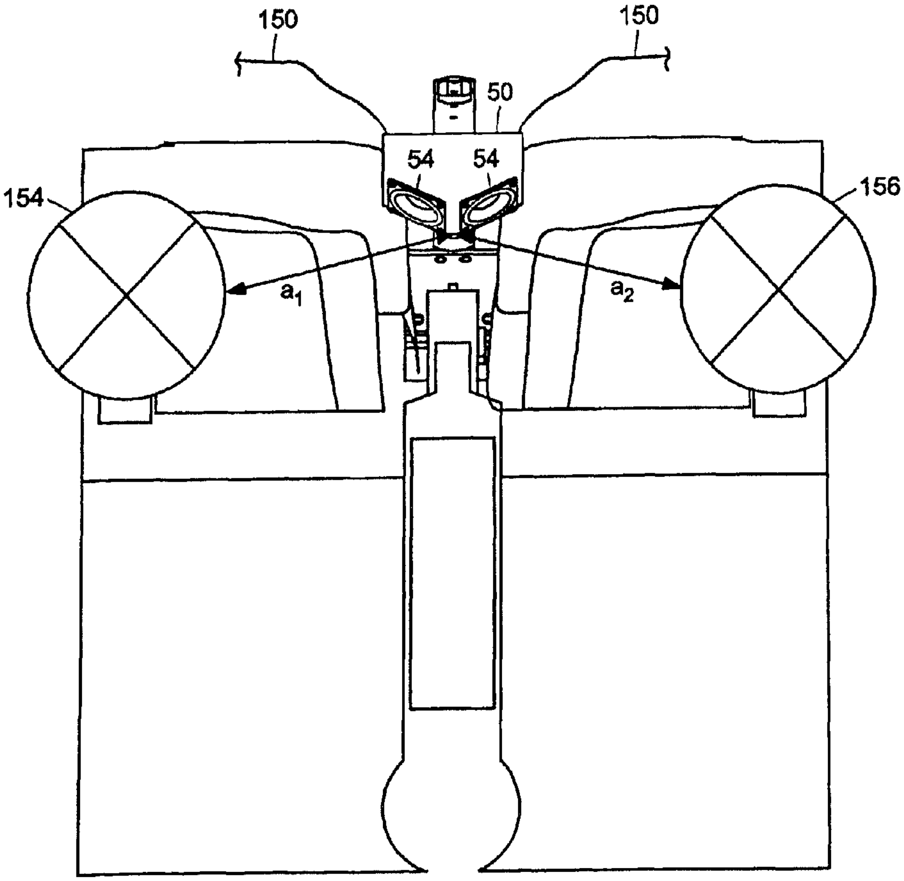

In FIGS. 7F and 7G, there are shown front and top partially diagrammatic views of the directional array of FIGS. 7A-7E, mounted for use with adjacent seats in a commercial theater or home theater. The directional array 50 is mounted in the structure between two adjacent seats 150 and 152 so that the center of the array is substantially equidistant (a1=a2) from the typical head locations 154 and 156 of the adjacent seats, slightly more than two shoulder lengths apart.

The first subarray (drivers 52 and 54) and the second subarray (56 and 57) operate as shown in one of FIGS. 4A-4B or in one of FIGS. 10A-10C below and described in the corresponding portion of the disclosure. Because the subarrays radiate sound directionally, the single device 50 can be conveniently placed at a convenient distance from the two adjacent seats and in a convenient location, but can still achieve the amount of isolation sufficient to take advantage of the effects stated above in describing FIGS. 4A-4C, and can provide the effects for a range of head heights. An embodiment according to FIGS. 7A-7G can also be configured to be a split frequency array, incorporating the embodiments of FIG. 4C or 10B below.

Figure 7H:
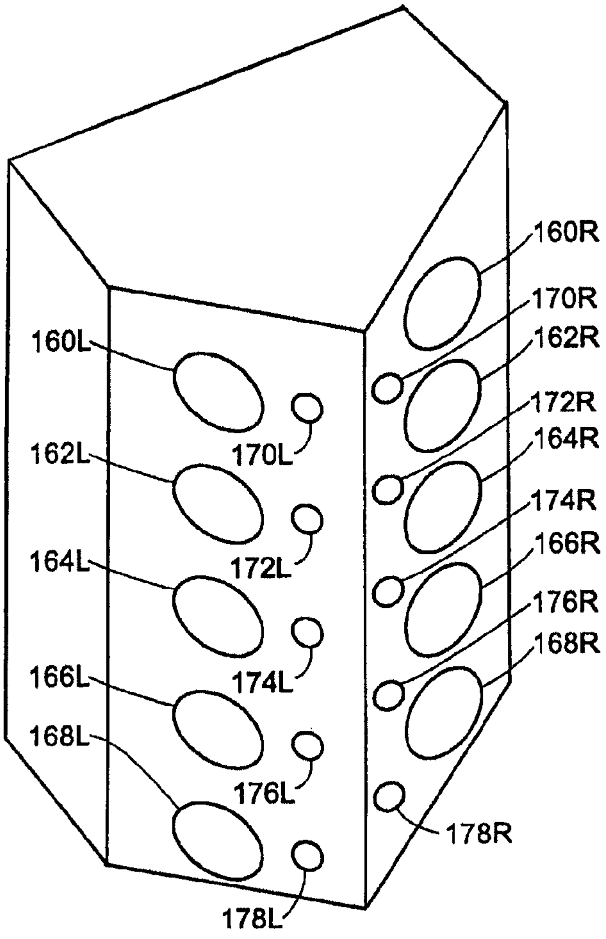
FIG. 7H is a front isometric view of a multipair multielement array suitable for use with the invention.

In FIG. 7H, another directional array is shown. The embodiment of FIG. 7H includes a plurality of directional arrays 160L and 160R, 162L and 162R, 164L and 164R, 166L and 166R, 168L and 168R, each including two acoustic drivers and each operating as described in referring to FIGS. 4A-4C. If desired the system may also include pairs of high frequency acoustic drivers 170L-178R, and operate as a split frequency array, as in FIG. 4C or 10B below. The drivers are mounted so that one (designated L) of each pair of drivers are mounted collinearly in a first straight line and so that the other (designated R) of the each pair of drivers are mounted collinearly in a second straight line, parallel with the first straight line. Each of the L drivers receives the same signal, such as the processed LS signal of FIGS. 4A-4C, or the processed LR signal of FIGS. 10A-10D below; each of the R drivers receives the same signal, such as the RS signal of FIGS. 4A-4C, or the RR signal of FIGS. 10A-10C below. The embodiment of FIG. 7H can also be a split frequency array, by including high frequency drivers arranged in a manner as described above, and making appropriate adjustments to the signal processing, as shown if FIGS. 4C and 10D.

Expressed differently, the embodiment of FIG. 7H is a pair of line arrays. A first line array includes the "L" drivers, that is the left-hand acoustic driver of each of the directional arrays. The second line array includes the "R" drivers, that is the right-hand acoustic driver of each of the directional arrays. Each of the acoustic drivers of the first line array receives an audio signal similar to the processed LS signal of FIGS. 4A-4C or the processed RR signal of FIGS. 10A-10D. Each of the acoustic drivers of the second line array receives an audio signal similar to the RS signal of FIGS. 4A-4C, or the RR signal of FIGS. 10A-10C.

In operation, a directional array according to FIG. 7H radiates sound in a radiation pattern that is directional in the x-y plane and that is substantially the same at the horizontal planes defined by the top and bottom arrays (160L and 160R, and 168L and 168R) and all horizontal planes in between.

An embodiment according to FIG. 7H is advantageous because the directionality of the line array can be effected over a larger vertical distance, that is, over a cylinder of greater height, and therefore accommodate a wide range of head heights. Additionally, an embodiment according to FIG. 7H may have acoustic advantages associated with line arrays.

Figure 8A:
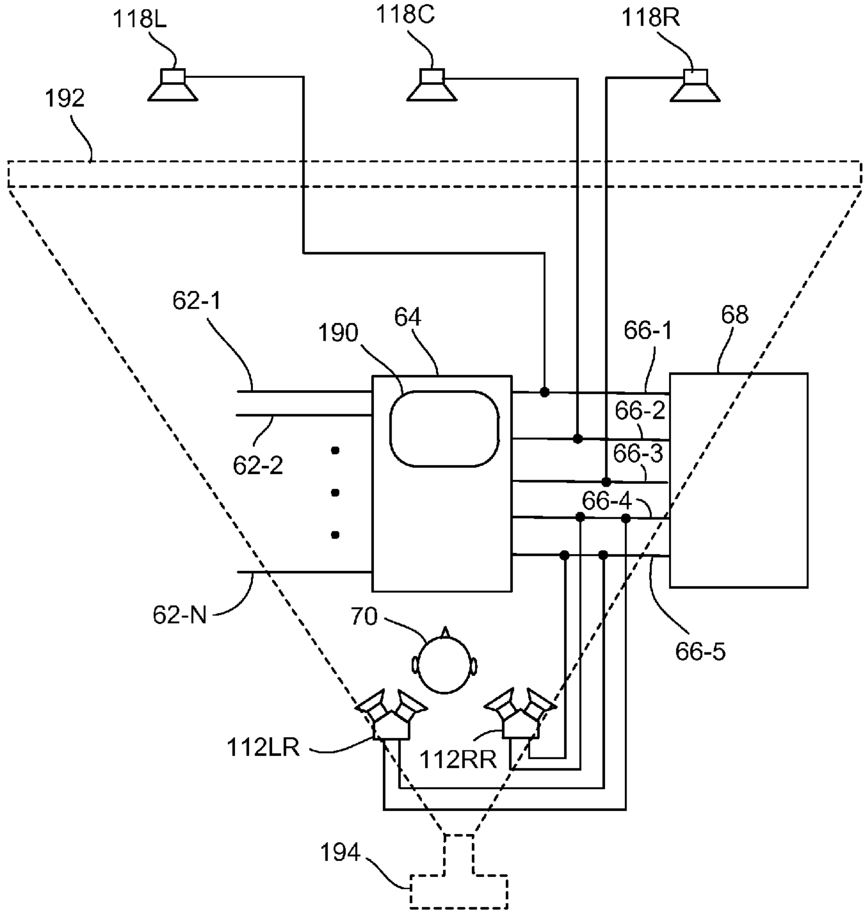
FIG. 8A is a block diagram of an audio mixing system according to the invention.

In FIG. 8A, there is shown a mixing console system according to the invention. A mixing console system produces sound tracks for professional recordings or for motion pictures or the like. A mixing console system typically has a mixing console that has a large number of input terminals, each corresponding to an input channel. The mixing console contains analog or digital circuitry or both to modify and combine the input channels and a user interface for a mixing technician to input mixing instructions. The mixing console has output terminals each representing an output channel. The output terminals are coupled to a recording device and to a playback system.

A mixing technician inputs mixing instructions at the mixing console, and the mixing console modifies the signal received at the input terminals according to the instructions. The mixing technician listens to an audio sequence modified according to the instructions and played back over the playback system, and either retains the modified audio sequence in the recording device, or replays the audio passage using different mixing instructions Mixing console 64 has input terminals 62-1-62-N, corresponding to N input channels. Mixing console 64 has output terminals 66-1-66-*n*, (in this example, n=5, but could be more or less) representing the output channels. The output terminals 66-1-66-5 are coupled to a recording device 68 and to a playback system according to the configuration of FIG. 5C. Non-local acoustic radiating devices 118LF, 118CF, 118RF, are positioned similarly to the like numbered elements of FIG. 3C, and further shows close acoustic radiating devices 112LR and 112RR, placed similarly and of similar function to devices 1214 and 1416 of FIG. 3C. Other implementations of mixing console systems could include configurations of FIGS. 3A-3C and 5A-5C. If the sound track is intended for use with a motion picture or other audio-visual program, there may also be a video monitor 190, which may be implemented in the console as shown, or may be a separate device. For use with projection type system, there may be a viewing screen 192, and a projector 194 for projecting an image onto the screen.

The mixing console system of FIG. 8A has a playback system consistent with the embodiments of FIG. 5C. Sound sources between distant acoustic radiating devices 118LF and 118CF, and between 118CF and 118RF can be simulated by amplitude panning. Sound sources in other locations can be simulated by HTRF processing as described above and as described in more detail in subsequent figures. In other embodiments, the mixing console may have playback systems of other of the embodiments of FIGS. 3A-3C, 5A, or 5B.

Mixing console 64 may be conventional, or may contain conventional processing circuitry, or, preferably, circuitry containing elements shown below in FIGS. 9A, 9B, and 10A-10C. There may be more or fewer output channels than are presented here. For example, there may be an additional low frequency effects (LFE) channel, or additional channels, such as a side channels, left center and right center channels, or additional surround channels. Monitor 190 and screen 192 may be conventional. Projector 194 may be a two dimensional (2D) or three dimensional (3D) projector. In the case of 3D devices, there may be additional elements not shown, such as polarized glasses, for use by the technician.

When inputting the mixing instructions, the mixing technician hears how the mixed audio output channels will sound on a playback system according to the invention, and therefore can mix the input signals to give a more realistic, pleasing result when played back over a system according to the invention. The output channels can also be used as the channels in a conventional surround sound system, so the channels as mixed can be played back over a conventional surround sound system. If the circuitry of mixing console 64 contains the playback elements of an audio system according to the invention, the mixing system can produce a sound track that is particularly realistic when reproduced by a playback system according to the invention. Inclusion of the circuitry in the mixing console 64, the playback system, or both will be discussed more fully in the discussion of FIGS. 11A and 11B below.

In the case of motion picture or television sound tracks, the technician also can mix the sound track so that, when transduced to acoustic energy, the acoustic energy that reaches the ears of the listeners may have locational audio cues (such as one or more of distance cues, ILD, ITD, and MS cues) consistent with the visual images. For example, if a visual image of an explosion appears on the monitor or screen to be far away from and in an orientation relative to the viewer, the technician can mix the sound track so that the audio cues associated with the explosion are consistent with an apparent sound source location far away and in the same orientation.

Figure 8B:
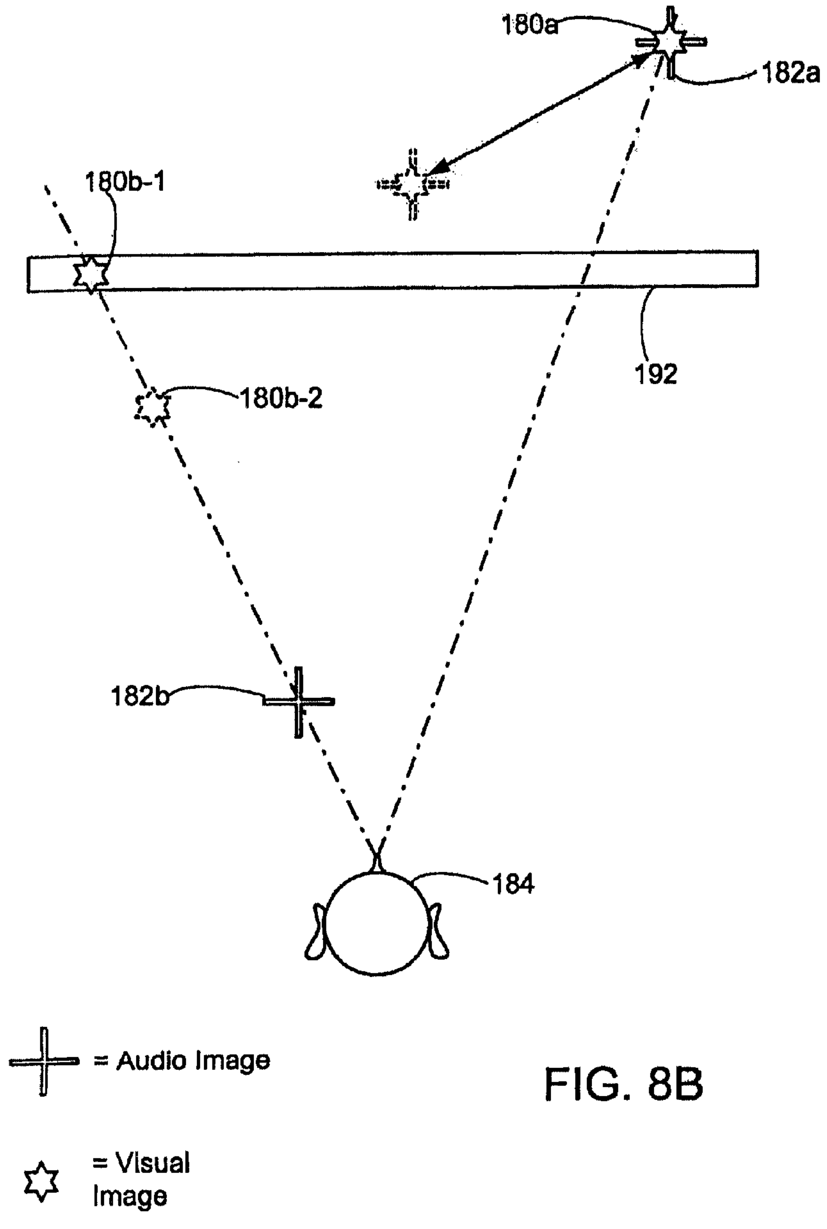
FIGS. 8B and 8C are diagrammatic views of systems for explaining some audio-visual aspects of the invention.

Referring to FIG. 8B, there is shown a diagram of an effect of playing back an audio-visual presentation including a sound track created by an audio-visual mixing system according to an embodiment of FIG. 8A. The locational audio cues of an audio event, for example a charging elephant, may be consistent with a sound source at position 182*a*. The visual image of the charging elephant may appear to be at position 180*a*, coincident with apparent location of the sound source. The apparent location of the sound source and the visual image can be also be made to appear to move together as indicated by the two-headed arrow. The effect of the coincidence of the apparent audio source and the visual image provides a more realistic sensory image for the viewer/listener 184.

A playback system according to the invention is especially advantageous for audio-visual events that are intended to appear between the screen and the viewer/listener 184. A second visual image 180*b*-1, for example, the visual image of a person near the viewer/listener speaking very softly, without the psychophysical cues provided by the audio system, may appear to be on the screen 192. Some projection techniques, such as making the image very large and using a "wrap-around" screen can be used to make the visual image seem somewhat closer, but it remains difficult to cause the visual image to appear to be closer than the screen. Listening to a sound track that has been mixed to provide audio cues consistent with a sound source close to the listener, for example at position 182*b*, may cause the perceived position of the event to appear to be closer to the viewer/listener, for example at position 180*b*-2.

Figure 8C:
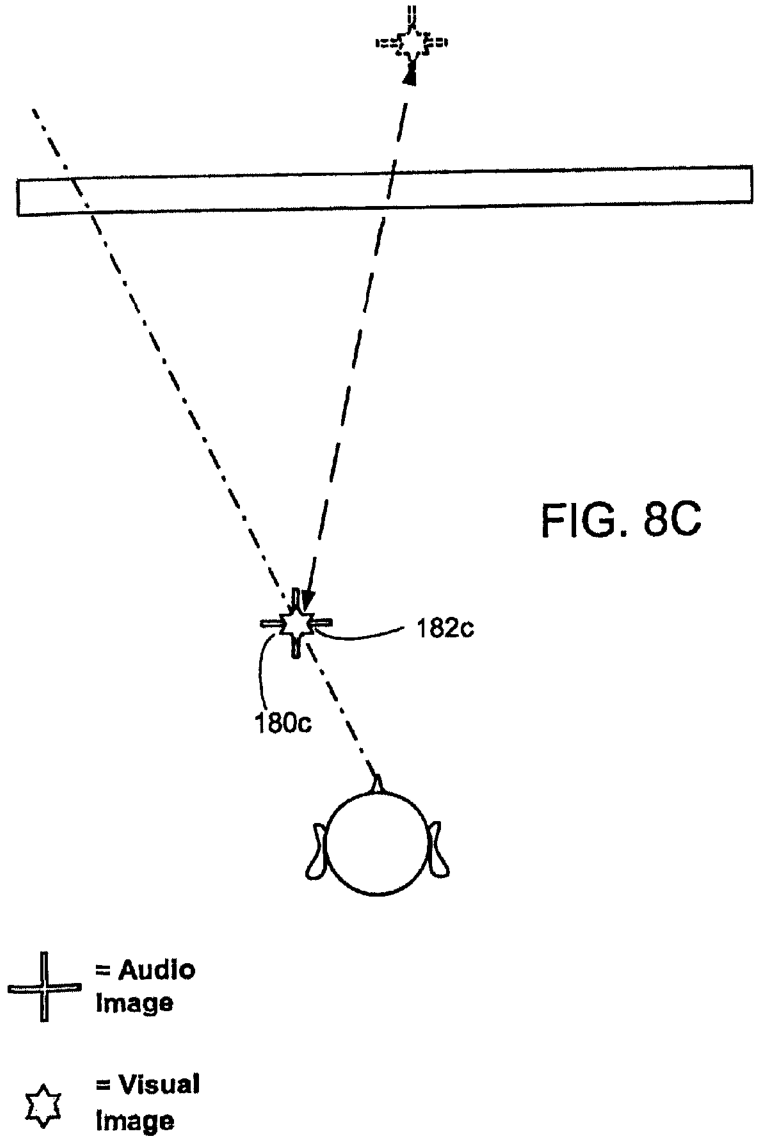

Referring now to FIG. 8C, using three dimensional (3D) visual techniques can provide an even more realistic sensory experience. In the embodiment of FIG. 8C, the distance cues may be consistent with a location 182*c* of the sound source that is coincident with the location 180*c* of the visual image and very close to the viewer/listener. For moving objects, the apparent audio source and the visual image can move together back and forth between a position in front of the screen to a position behind the screen, as indicated by the two-headed arrow.

The playback visual system for the embodiment of FIG. 8B may be a conventional monitor or flat screen projector system, or some more complex large screen system such as the theatre system developed by the IMAX® Corporation of Toronto, Ontario, Canada. The playback visual system for the embodiment of FIG. 8C may be a 3D visual system, such a projection system that projects stereoscopic images of different polarity, combined with viewer glasses with differently polarized lenses. The audio playback system can be one of the audio systems of FIGS. 3A-3C or 5A-5C. The local acoustic radiating devices of the audio systems of FIGS. 3A-3C and 5A-5C can provide a uniform sound image to the several viewers/listeners of a multiple seat room or theater, which is especially important for portraying audio-visual events close to the head.

Figure 9A:
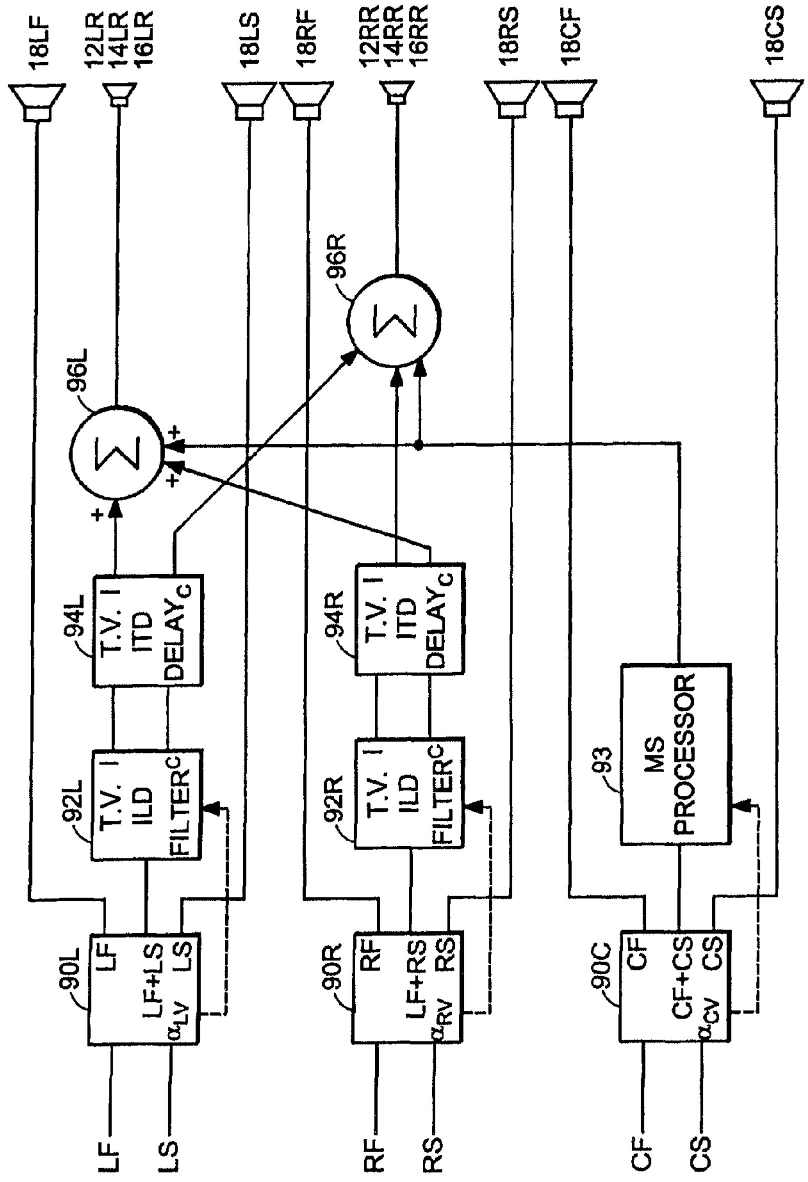
FIGS. 9A and 9B are block diagrams of signal processing systems in accordance with the invention.

Referring now to FIG. 9A, there is shown a block diagram of a signal processing system to provide audio signals for an audio system such as is shown in FIG. 3B. Channels LF and LS are input to a content determiner 90L. Content determiner 90LF determines the content of channels LF and LS that has the same phase (designated LF+LS), the content that is unique to channel LF (designated LF) and the content that is unique to channel LS (designated LS). The content determiner 90LF also calculates coefficients $\alpha_{LV}$, A1, and A2 according to the formulae $$A1 = \frac{|\overline{(LF+LS)}| - LF}{Y} \cdot \frac{|\overline{(LF+LS)}|}{X}$$

$$A2 = \frac{|\overline{(LF+LS)}| - Ls}{Y} \cdot \frac{|\overline{(LF+LS)}|}{X}$$

and $$\alpha_{LV} = 1 - \frac{(Y-LF)+(Y-LS)}{Y},$$

where Y is the larger of LF and LS and X is the larger of LF+LS and LF-LS. The angle $\theta_{LV}$, of the sound source is determined by $\theta_{LV}=\sin^{-1}\alpha_{LV}$. The values of LF, LS, X, Y, A1, A2, and $\alpha_{LV}$ are recalculated repeatedly, at intervals such as each 128 or 256 samples, so they vary with time.

The LF output of the content determiner 90LF is the LF playback signal. The LS output of the content determiner 90LF is the LR playback signal. Signal LF+LS is processed by a time varying ILD filter 92LF that uses as parameters head dimensions and the sine (denoted as $\alpha_{LV}$) of the time-varying angle θ. Time varying angle θ is representative of the location of a moving virtual loudspeaker. Since $\alpha_{LV}$ and $\theta_{LV}$ are related in a known way, the system may store the data in either form. Head dimensions may be taken from a typical sized head, based on a symmetric spherical head model for ease of calculation. In a more complex system, the head dimensions may be based on more sophisticated models, and may be the actual dimensions of the listener's head and may include other data, such as diffraction data. Time varying ILD filter 92L outputs the filtered ipsi-lateral ear (the ear closer to the audio source) audio signal and a filtered contra-lateral ear (the ear farther from the audio source) audio signal. The filtered ipsi-lateral ear audio signal and the filtered contra-lateral ear audio signal are then delayed by the time varying ITD delay 94L to provide a delayed ipsi-lateral ear audio signal and a delayed contra-lateral ear audio signal. The delay uses as parameters the head dimensions and $\alpha_{LV}$, the sine of the time-varying angle $\theta_{LV}$. The delayed ipsi-lateral ear audio signal and the delayed contra-lateral ear signal are typically different, except for sources in the median plane.

The RF signal and the RS signal are processed in a similar manner. The delayed ipsi-lateral ear audio signal of the LF-LS signal path is combined with the contra-lateral ear audio signal of the R-RS signal path at summer 96L. The delayed ipsi-lateral signal of the R-RS signal path is combined with the delayed contra-lateral signal of the LF-LS signal path at summer 96L.

The CF signal and the CS signal are input to a content determiner 90C, which performs a similar calculation as content determiner 90L and 90R. The CF output of the content determiner 90C is the CF playback signal. The CS output of the content determiner 90C is the CS playback signal. The CF+CL signal is processed by MS processor 93 to produce a processed monaural CF+CL signal. The MS processor applies a moving notch filter, with the notch frequency corresponding to the elevation angle $\theta_{CV}$, to provide an MS processed monaural signal, which is summed at summer 96L to provide the playback signals for devices 12LR, 14LR, and 16LR, and is summed at summer 9LR to provide the playback signals for devices 12RR, 14RR, and 16RR. Only the playback signals for devices 12LR, 14LR, and 16LR, and devices 12RR, 14RR, and 16RR contain any HRTF processed signal. In some implementations, the notch filter can represent angles for the full 360 degrees of elevation. For a sound source that moves from the front of the listener to the back of the listener, the effect of the source moving overhead, underneath, or through the listener can be attained.

Figure 9B:
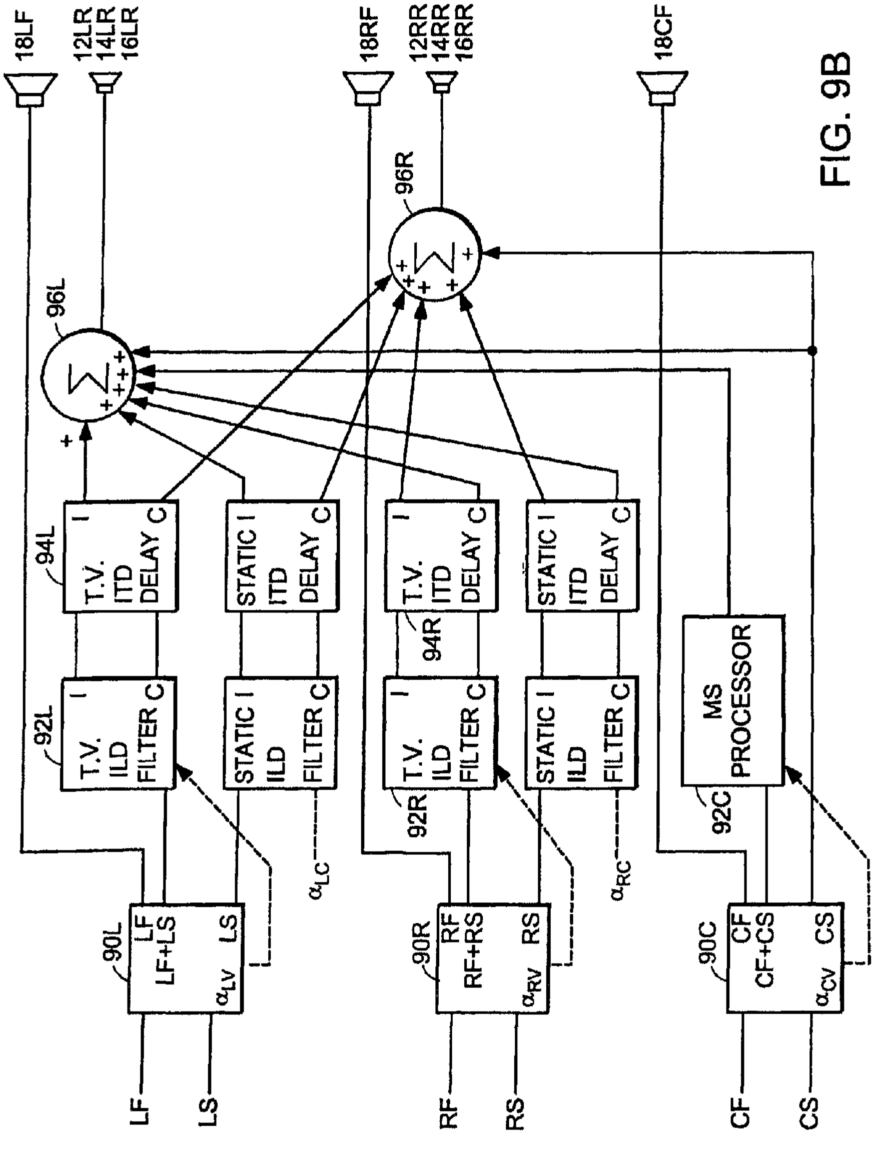

Referring now to FIG. 9B, there is shown a block diagram of a signal processing system to provide audio signals for an audio system such as is shown in FIG. 5B. In the process of FIG. 9B, the LF, LS, RF, RS, CF, and CS signals are processed by the content determiners 90L, 90R, and 90C, in a manner similar to the process of FIG. 9A. As in the process of FIG. 9A the LF and RF output signals of the content determiners are the LF and RF playback signals, respectively. The LF+LS, the RF+RS, and the CF+CS output signals of the content determiners are processed in a manner similar to the process of FIG. 9A. The LS and RS signals are processed by static ILD filters and static ITD delays. The static ILD filters and the static ITD delays are similar to the time-varying ILD filters and the time-varying ITD delays, except the angles $\theta_{LC}$ and $\theta_{RC}$ are fixed, so the values $\alpha_{LC}$ and $\alpha_{RC}$ are fixed. The angles $\theta_{LC}$ and $\theta_{RC}$ represent the angular displacement of a virtual rear speaker created by the radiation of acoustic devices 12LR and 12RR, 14LR and 14RR, and 16LR and 16RR. The ipsi-lateral output signal of the LF-LS signal path is summed at summer 96L, and the contra-lateral output signal of the LF-LS signal path is summed at summer 96R. The ipsi-lateral output signal of the R-RS signal path is summed at summer 96R, and the contra-lateral output signal of the R-RS signal path is summed at summer 96L. The output signal of the CS signal path is summed at summers 96L and 96R, with a scaling if desired. Only the signals radiated by playback devices 12LR, 12RR, 14LR, 14RR, 16LR, and 16RR are HRTF processed.

An embodiment according to FIGS. 9A and 9B is advantageous because it allows a more precise, controlled, and consistent perception of a sound source in the side. A system according to the invention provides actual ILD and ITD cues for sound sources on the side.

Some program material, typically digitally encoded, has metadata associated with the audio signals that explicitly specify the location of a sound source, including the orientation of the audio source relative to the listener, and the distance from the listener. Since the location information is specified, the filter and delay values can be determined directly, and the calculation of values $\alpha_{LV}$, $\alpha_{RV}$, and $\alpha_{CV}$, is not necessary.

A system according to FIG. 9A or 9B is advantageous because the HRTF processed signals are radiated by local acoustic devices, providing greater control of the ITD, ILD, and MS cues, and therefore a more consistent and realistic audio image from listening space to listening space.

Figure 11A:
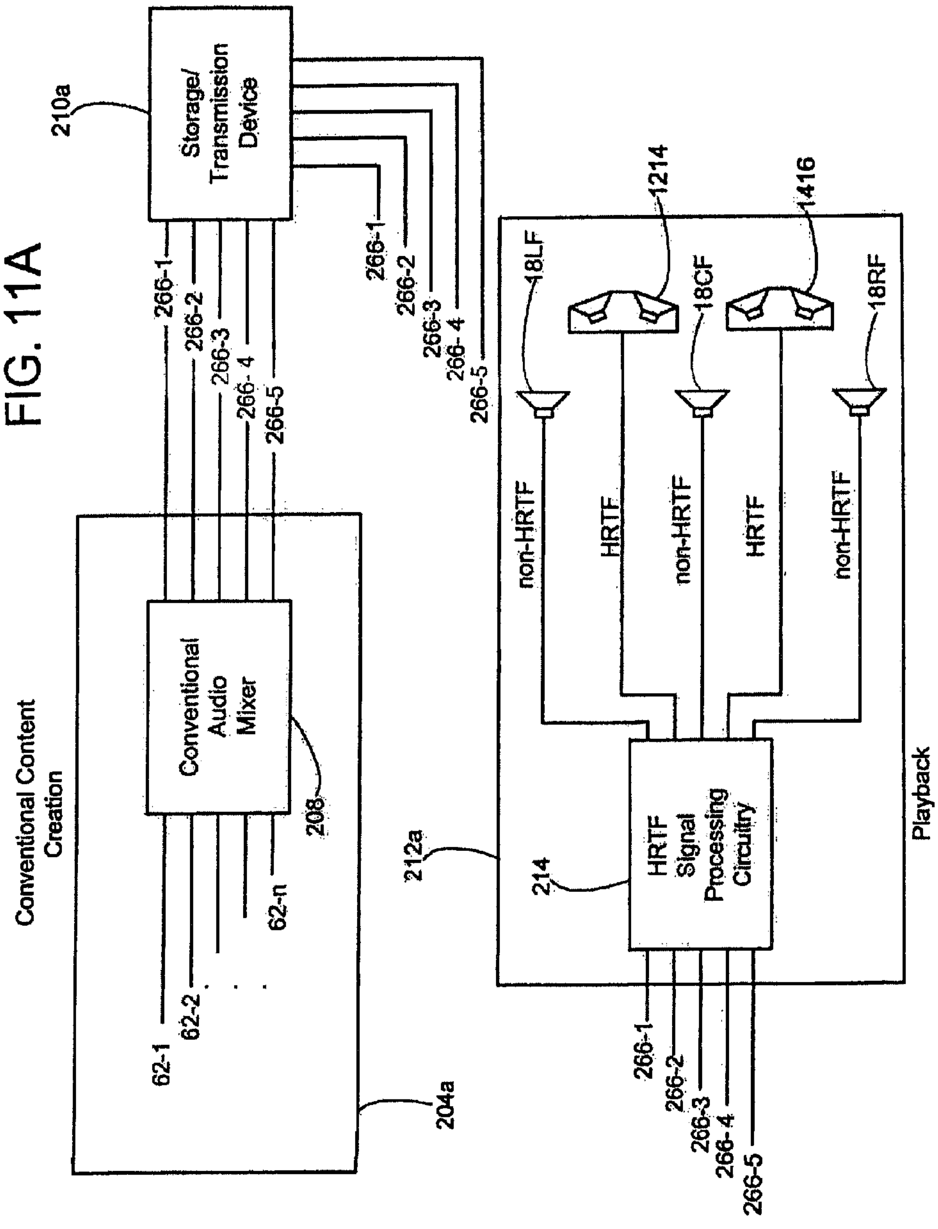
FIGS. 11A and 11B are block diagrams of two content creation and playback systems according to the invention.
Figure 11B:
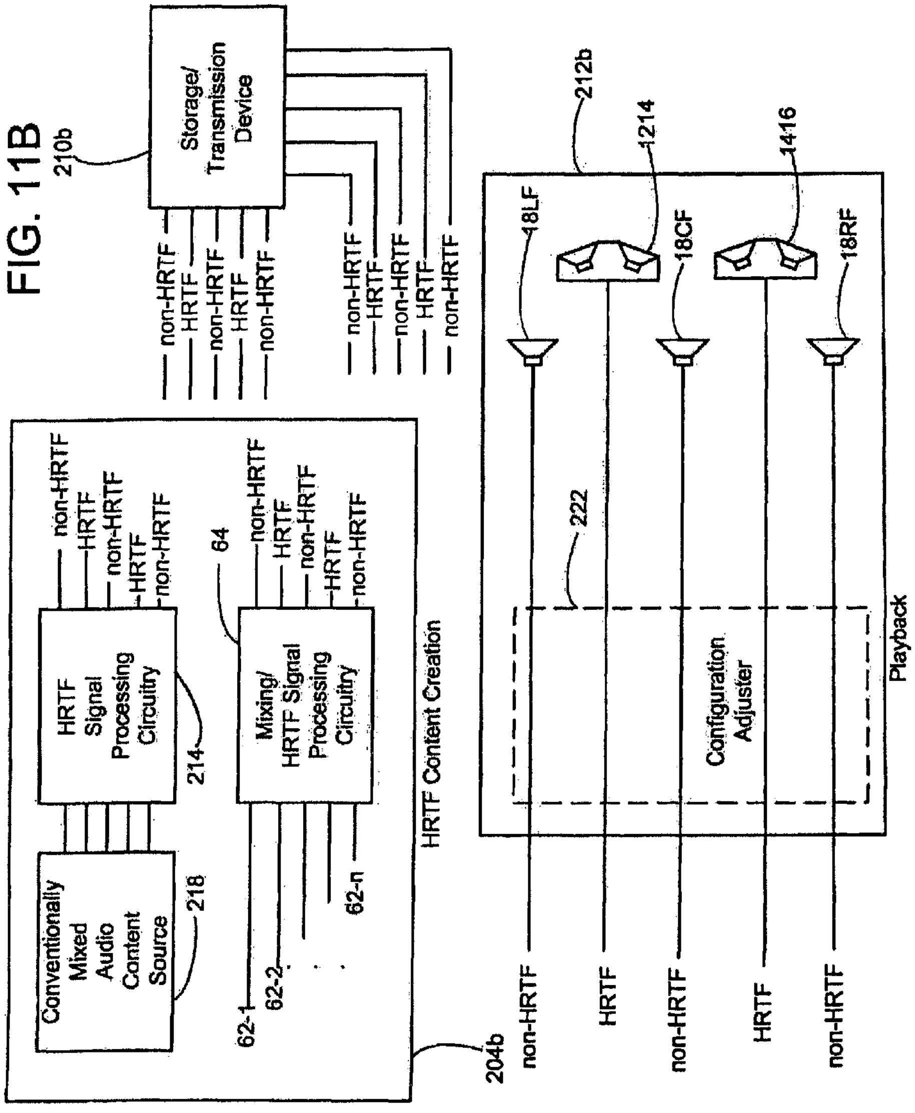

Referring now to FIGS. 11A and 11B, there are shown two content creation and playback systems embodying the principles of the invention. In FIG. 11A, a conventional content creation module 204*a* includes audio inputs terminals 62-1-

62-*n* and a conventional audio mixer 208. The conventional audio mixer 208 is coupled to a storage/transmission device 210*a* through signal lines 266-1-266-5, each of which transmits a conventional audio channel. The storage/transmission device is coupled to the playback system 212*a* by signal lines, which are identified by reference numbers 266-1-266-5 to denote that the storage/transmission device 210*a* outputs audio channels that correspond to the channels transmitted from the conventional audio mixer 208 to the storage/transmission device 210*a*. The playback system 212*a* includes HRTF signal processing circuitry 214 and transducers, for example, acoustic devices 18LF, 18CF, and 18RF, directional devices 1214 and 1416, which could be acoustic arrays 1214 and 1416. As in the previous figures, conventional devices, such as amplifiers, equalizers, clippers, compressors, and the like that are not germane to the invention are not shown.

In FIG. 11B, an HRTF content creation module 204*b* includes a source of HRTF encoded audio signals. The source of HRTF encoded audio signals may include a conventionally mixed audio content source 218, such a CD, DVD, or motion picture sound track, coupled to an HRTF signal processing circuitry 214. Alternatively, or in addition, the source of HRTF encoded audio signals may include audio input terminals 62-1-62-*n* coupled to HRTF mixing console 64, for example, the mixing console of FIG. 8A. The HRTF content creation module 204*b* is coupled to storage/transmission device 210*b* by signal lines, each transmitting an audio channel. The signal lines are designated "HRTF" or "non-HRTF" to signify that some of the channels contain HRTF encoded information and may also contain non-HRTF encoded information, and some of the channels do not contain any HRTF encoded information. The storage or transmission circuitry 210*b* is coupled to a playback module 212*b* by signal lines that are designated "HRTF" or "non-HRTF" to signify that the storage/transmission device 210*b* outputs audio channels that correspond to the channels transmitted from the HRTF content creation module. The playback module 212*b* may include a configuration adjuster 222 to adapt the signals to the number, bandwidth, location, and directionality of the transducers, and transducers 18LF, 18CF, and 18RF, and directional devices 1214 and 1416, for example directional arrays.

Audio input terminal 62-1-62-*n* may be similar to the like numbered input terminals of FIG. 8A. HRTF signal processing circuitry 214 may contain circuitry similar to the circuitry of FIGS. 9A-9C or 10A-10C. The transducers 18LF, 18CF, and 18RF and the directional devices 1214 and 1416 may be similar to the like numbered elements of previous figures. Configuration adjuster 222 may contain circuitry to adjust for the configuration of the playback system, for example to adjust for the presence or absence of low frequency device 20 of previous figures or additional acoustic devices of FIGS. 3A-3C and 5A-5C. The storage/transmission devices 210*a* and 210*b* may include equipment to transmit, for example as radio or television signals, the output of the content creation modules 204*a* and 204*b*, or may include data storage devices, such as mass storage devices, RAM, CD-ROM recording devices, DVD recording devices, and the like. The conventionally mixed audio content source 218 may be a device such as a compact disk, a CD-ROM, an audio tape, a RAM, or a audio receiver. HRTF mixing console 64 may be a mixing console such as the like numbered element of FIG. 8A.

In operation, in the system of FIG. 11A, conventional audio content is created in conventional content creation circuitry 204*a*. The content is then stored or transmitted by storage/transmission circuitry 210*a* as conventional created content. The conventionally created content is transmitted to playback system 212*a*, processed according to the invention by HRTF signal processing 214, and transmitted to the transducers.

In the system of FIG. 11B, HRTF processed audio content is created by applying HRTF signal processing to conventionally mixed audio content; by HRTF processing and mixing audio signals, as described above in the discussion of FIG. 8A; or both. The HRTF processed audio signals are stored or transmitted by storage/transmission circuitry 210*b* and transmitted to the transducers.

In the system of FIG. 11A, the content is stored or transmitted as conventionally encoded audio content. The content is mixed without reference to a specific playback system, so that the signals are compatible with conventional playback systems without HRTF processing. The advantage of the system of FIG. 11A is that the playback device 212*a* can use HRTF processing on conventionally mixed audio content to locate apparent sound sources.

In the system of FIG. 11B, the audio content is stored or transmitted as HRTF processed signals according to the invention. The content is mixed with reference to a specific playback system. The advantage of the system of FIG. 11B is that the playback circuitry can be significantly less complex and less expensive.

Figure 10A:
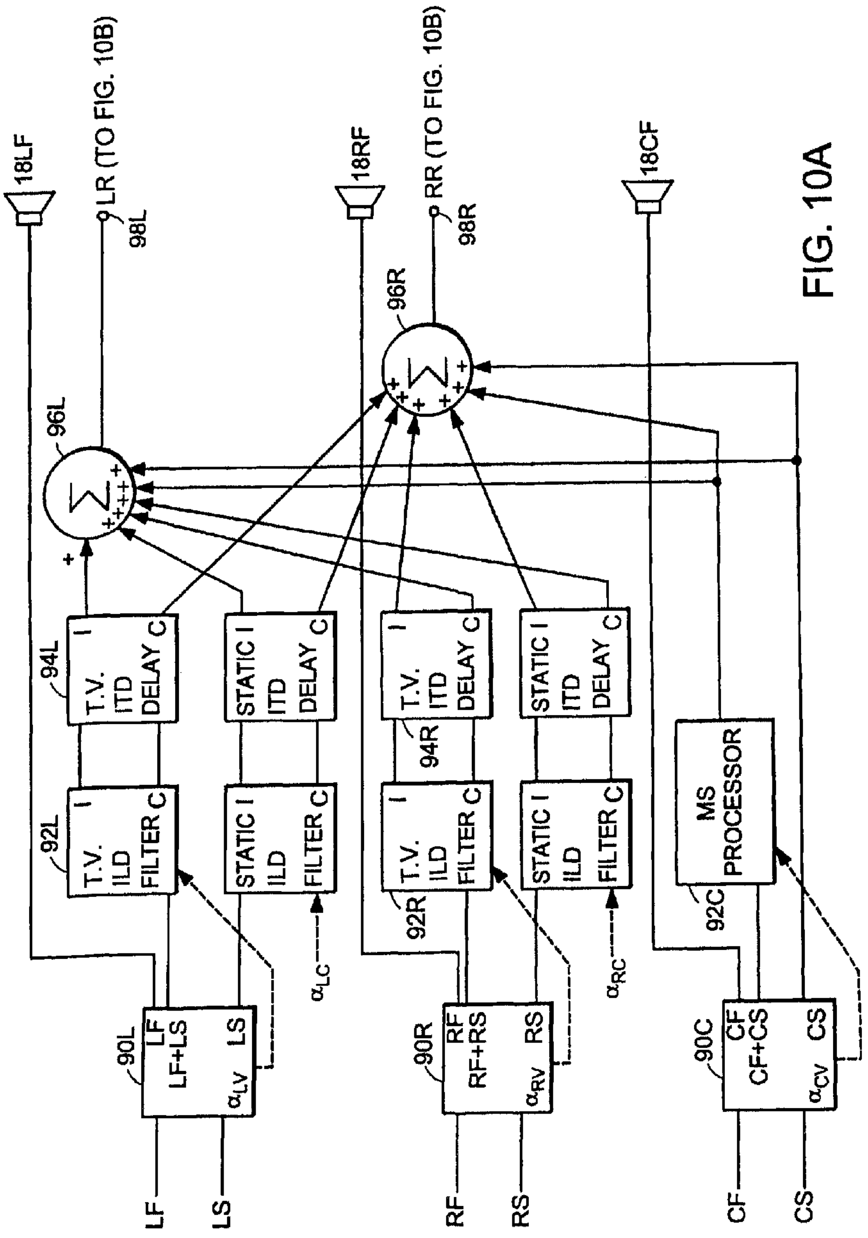
FIGS. 10A-10D are block diagrams of signal processing systems for use with directional arrays.
Figure 10B:
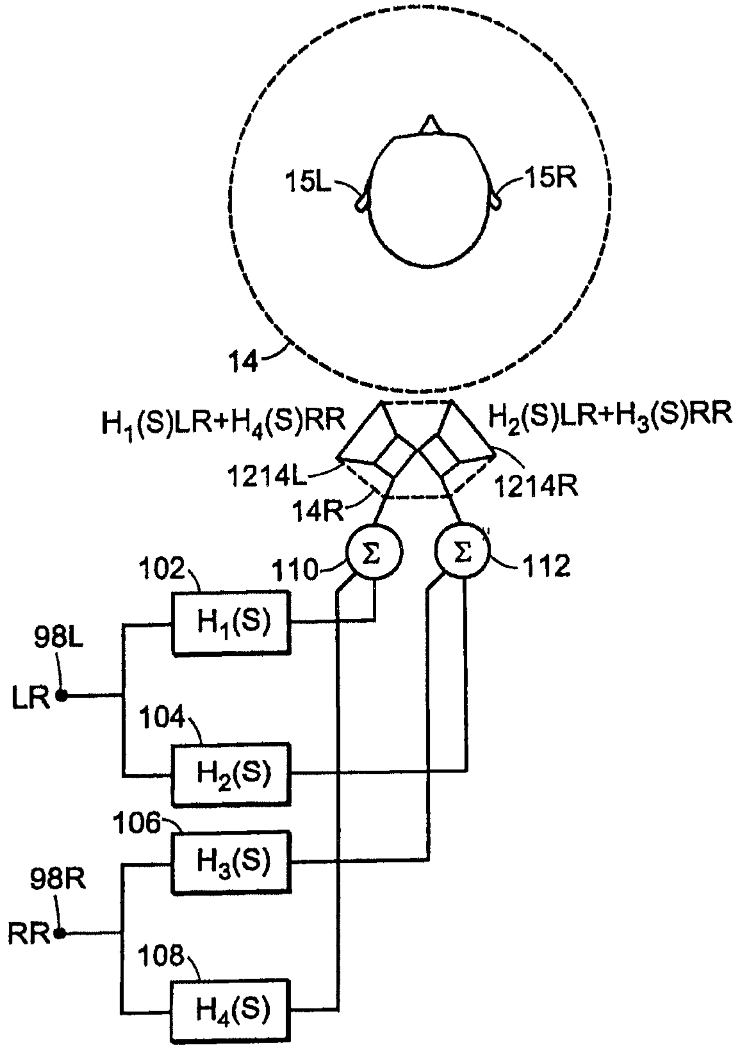
Figure 10C:
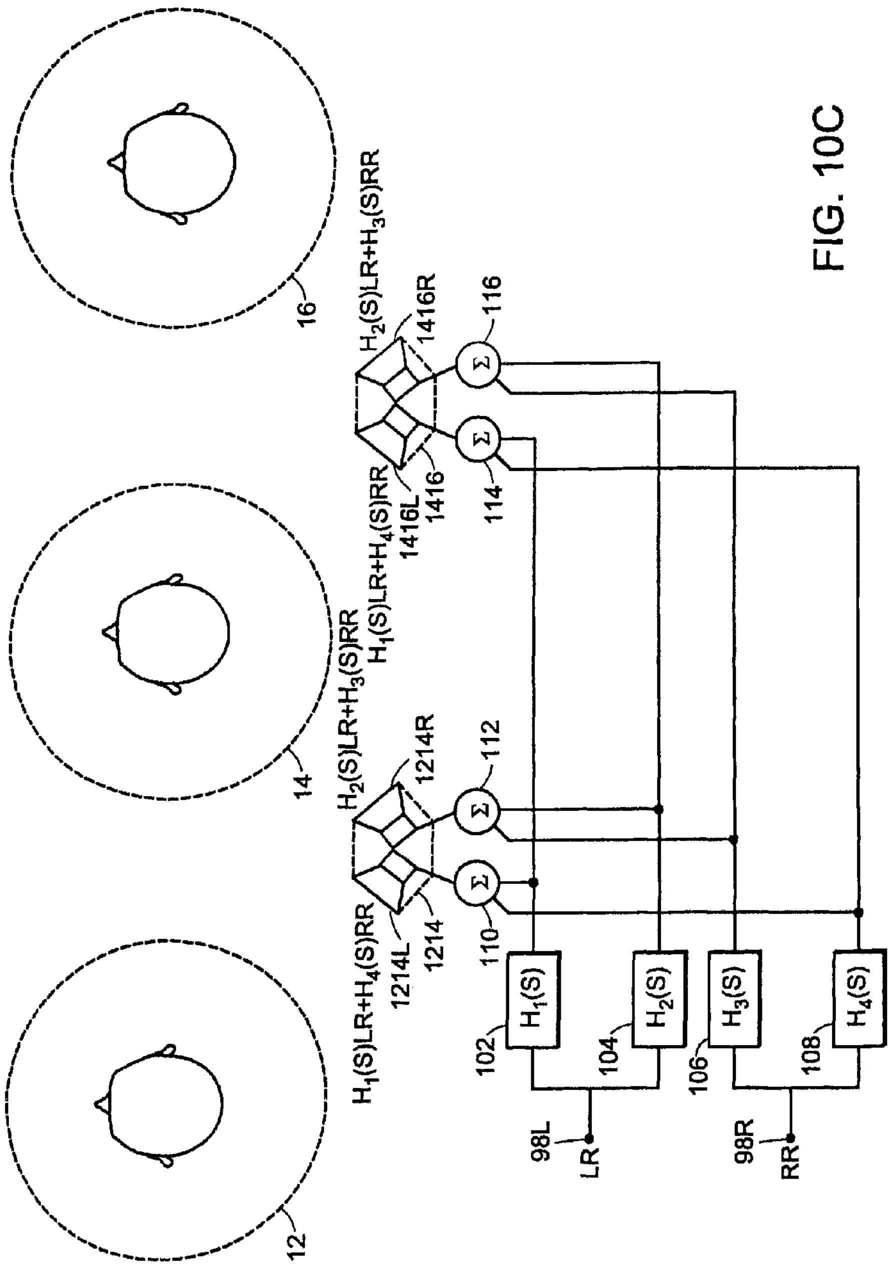
Figure 10D:
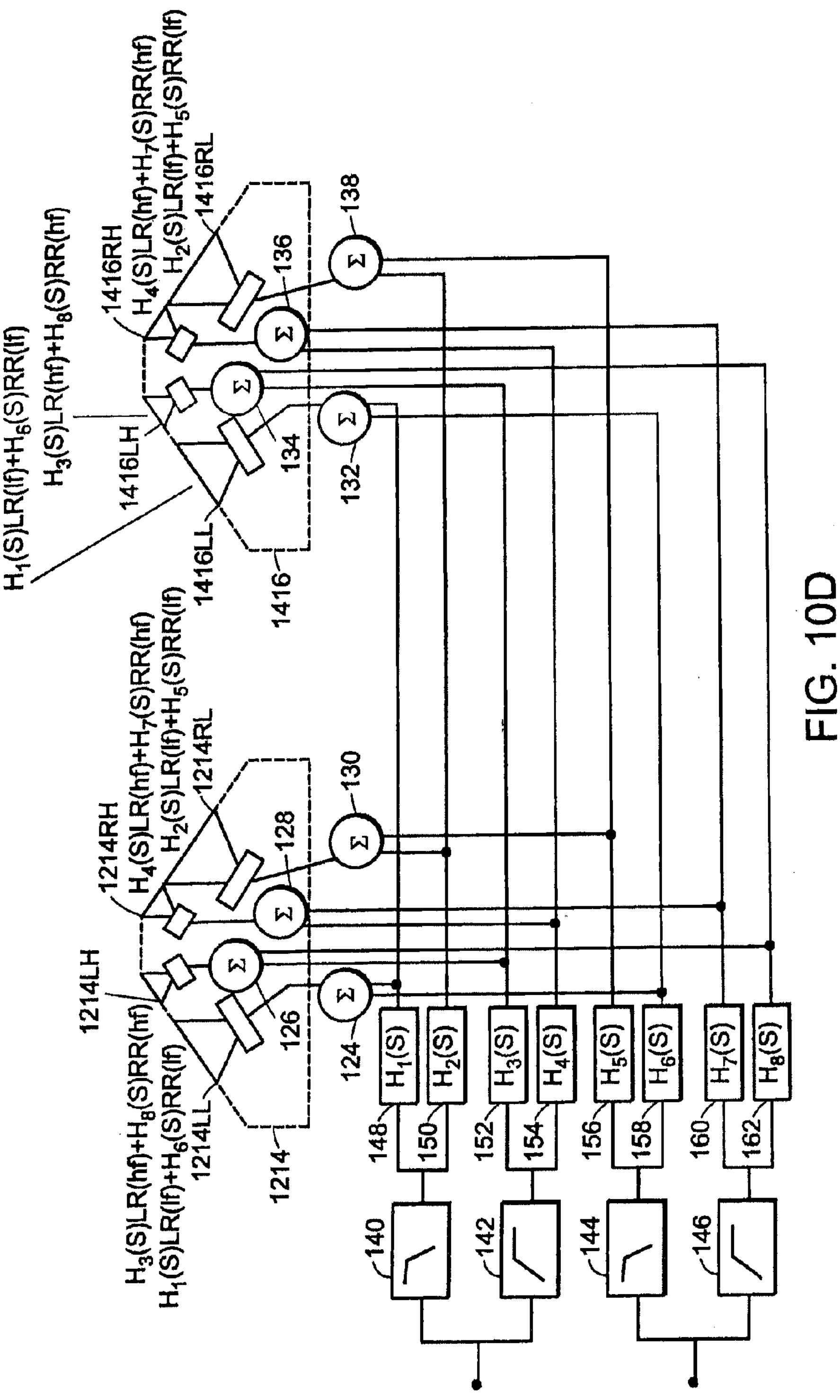

Referring to FIGS. 10A-10D, there are shown block diagrams of signal processing systems for modifying the playback signals of FIG. 9B for use with directional arrays. In FIG. 10A, the input signals are processed substantially as in FIG. 9B, except the output of summers 96L and 96R are not transduced, but are further processed at node 98L and 98R, respectively. In FIGS. 10A and 10B, the outputs of summers 96L and 96R are processed substantially as in FIGS. 4A and 4C, respectively, to provide audio signals for directional arrays such arrays 1214 and 1416 of a system of FIG. 5C. In FIG. 10C, the outputs of summers 96L and 96R are processed substantially as in FIG. 4B to provide audio signals for directional arrays for as device 14R in a system such as the system of FIG. 5A.

If the program material was mixed according to the embodiment of FIG. 8 the program material may be input directly to the playback system without the processing of FIGS. 9A-9B or 10A-10C. The playback system may need to be processed to furnish the appropriate number and type of output channels. Processing can include splitting an audio signal into frequency ranges, or downmixing two channels to create a third channel, or upmixing two channels to create one, or some similar operation. Splitting an audio signal into frequency ranges can be done by well-known conventional circuitry.

The functions of the blocks of FIGS. 9A-10D may be performed by digital signal processing (DSP) elements that may include software modules performing signal processing on streams of digitally encoded audio signals.

An audio system according to the embodiments of FIGS. 10A-10C, is advantageous because the directional acoustic devices provide acoustic isolation, and improved control over the audio signals at the ear, thereby providing a more realistic and uniform acoustic image from listening space to listening space.

It is evident that those skilled in the art may now make numerous uses of and departures from the specific apparatus and techniques disclosed herein without departing from the inventive concepts. Consequently, the invention is to be construed as embracing each and every novel feature and novel combination of features present in or possessed by the apparatus and techniques disclosed herein and limited only by the spirit and scope of the appended claims.

The invention claimed is:

1. An audio system for use in a listening area comprising a plurality of listening spaces, the audio system having a plurality of audio channels, the audio system comprising:

a processor configured to process incoming audio signals into a plurality of audio channels;

a first acoustic radiation device, positioned inside said listening area and outside and in front of said plurality of listening spaces, for radiating first sound waves corresponding to a first of said plurality of audio channels; and a second acoustic radiation device, positioned in a location within a first of said plurality of listening spaces, the second acoustic radiation device coupled to a seat in the first listening space such that the second acoustic radiation device is positioned close to and to the rear of the head of a first listener when seated in the seat, for radiating second sound waves corresponding to a second of said plurality of audio channels and third sound waves corresponding to a third of said plurality of audio channels; and a third acoustic radiation device, positioned in a location within the first listening space the third acoustic radiation device coupled to the seat such that the third acoustic radiation device is positioned close to and to the rear of the head of the first listener when seated in the seat, for radiating fourth sound waves corresponding to the second audio channel and fifth sound waves corresponding to the third audio channel;

wherein the processor is configured to apply a head-related transfer function to the incoming audio signals to produce the signals corresponding to the second and third audio channels, and the processor is further configured to process the second and third audio channels such that the fourth sound waves destructively interfere with the second sound waves in the vicinity of a right ear of the first listener, and the third sound waves destructively interfere with the fifth sound waves in the vicinity of the left ear of the first listener.

2. The audio system of claim 1, wherein the second acoustic radiation device is positioned behind and to the left of a centerline of the head of the first listener, and the third acoustic radiation device is positioned behind and to the right of a centerline of the head of the first listener, adjacent to the second acoustic radiation device.

3. The audio system of claim 1, wherein the second acoustic radiation device is positioned between the first and a second of said plurality of listening spaces, the first and second listening spaces being adjacent to each other, behind and to the left of the head of the first listener, and behind and to the right of the head of a second listener seated within the second listening space, and the third acoustic radiation device is positioned between the first and a third of said plurality of listening spaces, behind and to the right of the head of the first listener, and behind and to the left of the head of a third listener seated within the third listening space.

4. The audio system of claim 3, wherein the second and third acoustic radiation devices are directional devices.

5. The audio system of claim 1, wherein the second acoustic radiation device is a directional device.

6. The audio system of claim 5, wherein the third acoustic radiation device is a directional device.

7. The audio system of claim 5 wherein the directional device is an interference type directional device comprising at least two radiating elements that radiate sound that interferes destructively in a frequency range in which the wavelength is larger than the diameter of the radiating element.

8. The audio system of claim 1 further comprising a plurality of acoustic radiation devices, positioned inside said listening area and outside and in front of said plurality of listening spaces, for radiating a plurality of sound waves corresponding to a second plurality of audio channels.

9. The audio system of claim 1 wherein the first audio channel is one of a left front channel, a center channel, or a right front channel, the second audio channel is a left personal audio channel, and the third audio channel is a right personal audio channel.

10. The audio system of claim 1 further comprising a fourth acoustic radiation device, positioned in a location within the first of said plurality of listening spaces, located close to and in front of the head of the first listener, for radiating sixth sound waves corresponding to the first audio channel.

11. The audio system of claim 10 wherein the fourth acoustic radiation device is a high frequency transducer.

12. The audio system of claim 11 wherein the fourth acoustic radiation device operates in the frequency range above 1.6 KHz.

13. The audio system of claim 11 wherein the high frequency transducer is configured to supplement or replace output from the first acoustic radiation device.

14. The audio system of claim 1 wherein the second acoustic radiation device additionally radiates seventh sound waves corresponding to the first audio channel and the third acoustic radiation device additionally radiates eighth sound waves corresponding to the first audio channel.

15. The audio system of claim 14 wherein signals provided to the second and third acoustic radiation devices for reproduction as the seventh and eight sound waves are processed by the processor to alter, when the seventh and eight sound waves combine with the first sound waves at the first listener's location within the first listening space, the perceived distance at which an auditory image corresponding to the first audio channel is localized by the first listener.

16. The audio system of claim 15, wherein the processing of signals alters the perceived distance so that the perceived location of the auditory image corresponds with the perceived location of a visual image viewed by the first listener on a stereoscopic 3D display.

17. The audio system of claim 1, wherein a perceived location of an auditory image provided by the audio system corresponds with the perceived location of a visual image viewed by the first listener on a stereoscopic 3D display.

18. The audio system of claim 1 wherein the plurality of listening spaces correspond to seats in a vehicle passenger compartment.

19. The audio system of claim 1 wherein the plurality of listening spaces correspond to seats in a theater.

* * * * *